(12) United States Patent
Yukawa et al.

(10) Patent No.: US 8,033,309 B2
(45) Date of Patent: Oct. 11, 2011

(54) ASSEMBLY OF PNEUMATIC TIRE AND RIM, AND A NOISE DAMPER USED THEREIN

(75) Inventors: Naoki Yukawa, Kobe (JP); Yuji Sasaki, Anjo (JP); Atsuhiko Itakura, Anjo (JP)

(73) Assignees: Sumitomo Rubber Industries, Ltd., Kobe-Shi (JP); Inoac Corporation, Anjo-Shi (JP)

( * ) Notice: Subject to any disclaimer, the term of this patent is extended or adjusted under 35 U.S.C. 154(b) by 796 days.

(21) Appl. No.: 12/155,624

(22) Filed: Jun. 6, 2008

(65) Prior Publication Data

US 2008/0251186 A1    Oct. 16, 2008

Related U.S. Application Data

(62) Division of application No. 11/269,676, filed on Nov. 9, 2005, now Pat. No. 7,455,092.

(30) Foreign Application Priority Data

Nov. 19, 2004 (JP) ................................. 2004-336574
Nov. 19, 2004 (JP) ................................. 2004-336575
Nov. 19, 2004 (JP) ................................. 2004-336576

(51) Int. Cl.
    *B60C 19/00*    (2006.01)
(52) U.S. Cl. ..................... 152/154.1; 152/155; 152/157; 152/158
(58) Field of Classification Search ............. 152/154.1, 152/155, 157, 158
    See application file for complete search history.

(56) References Cited

U.S. PATENT DOCUMENTS

| 2003/0188817 A1 | 10/2003 | Yukawa et al. |
| 2005/0155686 A1* | 7/2005 | Yukawa et al. ............... 152/450 |
| 2005/0275277 A1* | 12/2005 | Yukawa ...................... 301/6.91 |

FOREIGN PATENT DOCUMENTS

| EP | 197 50 229 A1 | 6/1999 |
| EP | 1 529 665 A1 | 5/2005 |
| EP | 1 577 123 A1 | 9/2005 |
| JP | 04-334603 A | 11/1992 |
| JP | 2002-178712 A | 6/2002 |
| JP | 2003-63208 A | 3/2003 |
| JP | 2003-252003 A | 9/2003 |
| JP | 2003-285607 A | 10/2003 |
| WO | WO-03/103989 A1 | 4/1991 |

* cited by examiner

*Primary Examiner* — Khanh P Nguyen
*Assistant Examiner* — Vishal I Patel
(74) *Attorney, Agent, or Firm* — Birch, Stewart, Kolasch & Birch, LLP

(57) ABSTRACT

A pneumatic tire and a rim includes a noise damper, fixed to a tire inner surface or a rim inner surface with the upper surface facing a tire inner space, and extending in the tire circumferential direction. The noise damper is made of a sponge having a volume ranging from 0.4 to 20% of the volume of the tire inner space. The noise damper is a laterally long and flat, with a maximum thickness ranging from 5 to 45 mm and a width more than the maximum thickness. The upper surface extends along a wavy curve including a hilltop, valley bottoms on each side of the hilltop and slopes extending down to the respective valley bottoms from the hilltop. Each end of the upper surface is terminated at the valley bottoms or the slopes. A thickness from the upper surface to the bottom surface ranges from 1.0 to 15.0 mm.

2 Claims, 28 Drawing Sheets

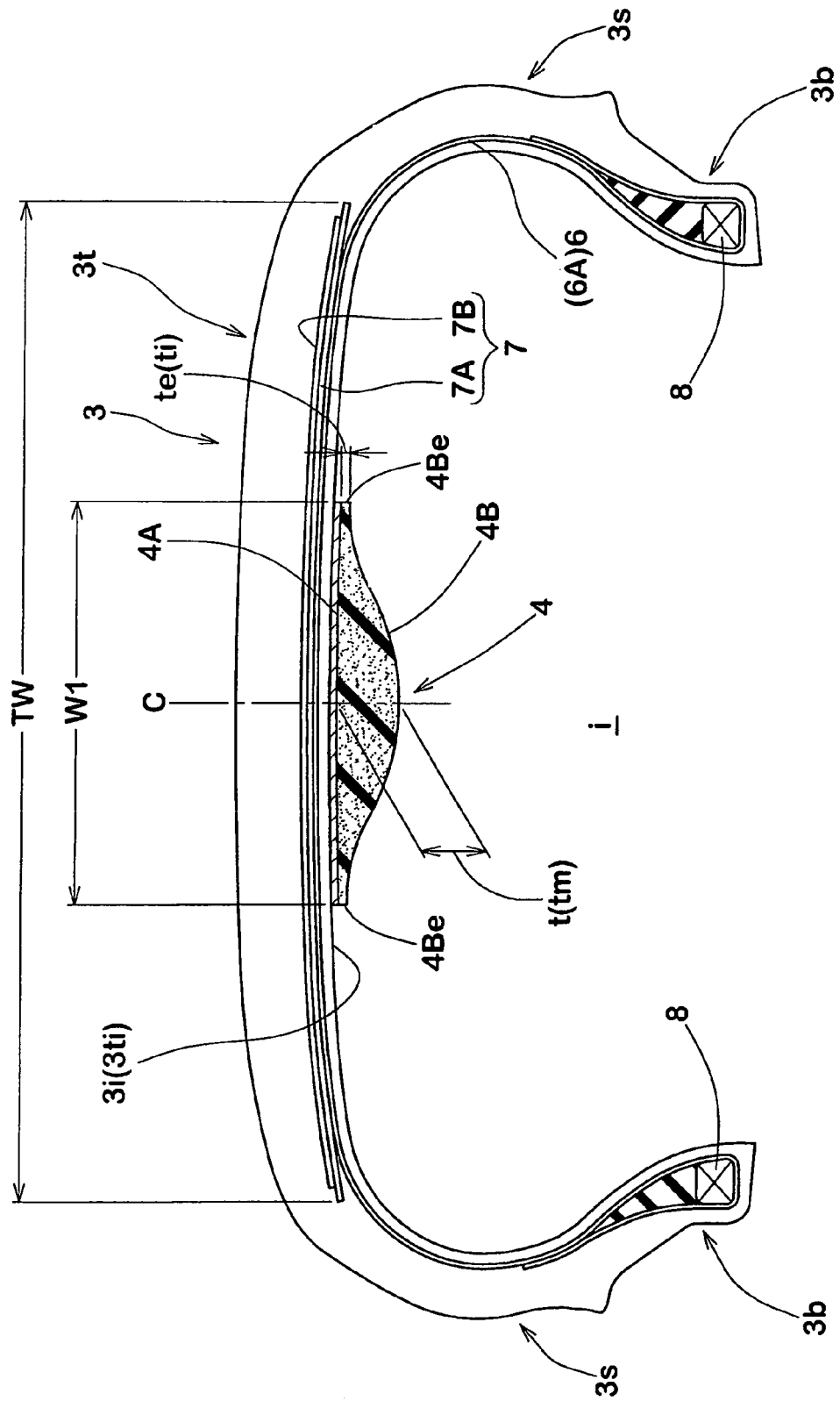

ASSEMBLY OF PNEUMATIC TIRE AND RIM, AND A NOISE DAMPER USED THEREIN

This Application is a Divisional of application Ser. No. 11/269,676 filed on Nov. 9, 2005 now U.S. Pat. No. 7,455,092, and for which priority is claimed under 35 U.S.C. §120, and this Application claims priority of Application Nos. 2004-336574, 2004-336575, and 2004-336576 filed in Japan on Nov.19, 2004, under 35 U.S.C. §119; the entire contents of all are hereby incorporated by reference.

BACKGROUND OF THE INVENTION

1. Field of the Invention

The invention relates to an assembly of a pneumatic tire and a rim having a band-like noise damper made of a sponge in a tire inner space, and to the noise damper used in the assembly.

2. Description of the Background Art

It has been known that one of tire noises is a road noise generated in the frequency region of from about 50 to about 400 Hz and that a resonance vibration (cavity resonance) of air occurring in the tire inner space is as a main cause. In order to reduce such a road noise, the applicant has offered an assembly (c) of a tire having a band-like noise damper (b) made of a sponge and extending in the tire circumferential direction in a tire inner space (a), which is shown in, for example, FIG. 22 and a rim (see, for example, JP-A No. 2003-252003). The noise damper (b) converts vibration energy of air in the tire inner space (a) to thermal energy to thereby, enable cavity resonance in the tire inner space (a) to effectively suppressed.

In a case where a pneumatic tire (d) is demounted from the rim (e), air in the tire inner space (a) is at first exhausted and then, a bead portion (d1), which is part of the tire (d), is pressed down into a well portion (e2) of the rim. Thereafter, a tire lever (f) is inserted into a clearance between the bead portion (d1) and a flange (e1) of the rim (e), and the tire lever (f) is inclined around the outer edge of the flange (e1) as a fulcrum to thereby take out the bead portion (d1) outward from the flange (b).

A conventional noise damper (b), however, has a comparatively large thickness and a sectional shape thereof is rectangular or trapezoidal. That is, each side surface of the noise damper (b) is of a steep slope that rises high upwardly. Therefore, an inconvenience arises that the distal end of the tire lever (f) is, as shown with an imaginary line in FIG. 22, brought into contact with the noise damper (b) to thereby break the noise damper (b) or separate the noise damper (b) from the tire (d).

On the other hand, since the noise damper (b) made of a sponge is high in water absorptivity, there arises an unfavorable possibility that the sponge is wetted by rain or the like while a tire is stored or the tire and a rim are assembled. If a tire and a rim are assembled in a water absorption state, problems occur that the absorbed water adversely affects a weight balance to thereby cause tire vibrations, or permeates into rubber of the tire to thereby induce an internal damage. Therefore, in a case where a tire and a rim are assembled, it is necessary to remove water sufficiently, but a sponge having been once wetted is hard to be dried instantly, which makes its handling cumbersome.

SUMMARY OF THE INVENTION

It is a first object of the invention to provide an assembly of a pneumatic tire and a rim capable of diminishing a chance that a tire lever is brought into contact with a noise damper when the tire is demounted from the rim and preventing breakage of the noise damper in tire exchange or the like.

It is a second object of the invention to provide a method for forming a noise damper capable of efficiently forming the noise damper used in the assembly of a pneumatic tire and a rim.

It is a third object of the invention to provide a noise damper capable of exerting a excellent water repellent performance, absorbing no water even in a case where the noise damper is exposed to water for a long time, drying the noise damper quickly by wiping off water or the like, improving handlability and preventing various problems such as tire vibrations and internal damage of a tire caused by water absorption.

The invention of an assembly of a pneumatic tire and a rim includes:

a rim;

a pneumatic tire mounted to the rim; and a band-like noise damper, made of a sponge having a volume in the range of from 0.4 to 20% of the entire volume of a tire inner space enclosed by the rim and the pneumatic tire, having a bottom surface fixed on a tire inner surface or a rim inner surface surrounding the tire inner space and an upper surface facing the tire inner space, and a noise damper extending in the tire circumferential direction in the tire inner space, wherein in a tire meridian section including the tire axis, the noise damper is of a laterally long, flat sectional shape having a maximum thickness value (tm) from the bottom surface to the upper surface in the range of from 5 to 45 mm and having a width (W1) of the bottom surface more than the maximum thickness value (tm), the upper surface extends along a wavy curve that is repetition of a wavy element in the width direction including a hill top portion having the maximum thickness value (tm), valley bottom portions on each side of the hill top portion having the minimum thickness value (ti) and slope portions extending down to the respective valley bottom portions from the hill top portion, and each end in the width direction of the upper surface is terminated at the valley bottom portions or the slope portions, and a thickness (te) from the upper surface to the bottom surface is in the range of from 1.0 to 15.0 mm.

With such a construction adopted, when a tire is demounted from a rim, a tire lever can have decrease in chance to be brought into contact with a noise damper, thereby enabling breakage of the noise damper in tire exchange or the like to be prevented.

The invention of a method for forming a noise damper, in a case where the wavy curve is of a sine wave, includes:

a transport step of feeding a flat plate-like sponge having first and second surfaces substantially parallel to each other in the length direction perpendicular to the thickness direction;

a deformation step of deforming the fed sponge in the profile of a sine wave in section perpendicular to the length direction by pressing each of the first and second surfaces of the sponge alternately toward the other surface;

a cutting step of obtaining two half sponges sections of which each have the profile of a sine wave and are reversals of each other in profile in a state where the pressing pressure is removed, by slicing the sponge deformed in the profile of a sine wave along a flat cutting plane continuously extending in the width direction between the first and second surfaces; and a division step of dividing the half sponges to said plurality of noise dampers by cutting the half sponges at valley portions thereof each having a smaller thickness along the length direction.

The invention of a method for forming a noise damper, in a case where the wavy curve is of a trapezoidal wave, includes:

a cutting step of obtaining two half sponges sections of which each have the profile of a trapezoidal wave by slicing a flat plate-like sponge having first and second surfaces substantially parallel to each other between the first and second surfaces along a combination of cutting planes continuously extending in the profile of a trapezoidal wave in the width direction between the first and second surfaces; and a division step of dividing the half sponges to said plurality of noise dampers by cutting the valley portions each with a smaller thickness of a half sponge along the length direction.

With such methods applied, a noise damper with the wavy curve in the profile of a sine wave and a noise damper with the wavy curve in the profile of a trapezoid can be efficiently formed.

A noise damper of the invention made of a water repellent polyurethane sponge obtained by foam curing a mixed composition including a polyisocyanate, polyol, a water repellent and a foaming agent, wherein the polyol is a mixture of a polyester polyol and a polyester polyether copolymer polyol, the polyol includes: 3 to 60% by weight of polyester polyol; and 97 to 40% by weight of polyester polyether copolymer polyol, and the water repellent in quantity in the range of from 25 to 80 parts by weight mixed into 100 parts by weight of polyol.

With such a composition adopted, a noise damper of the invention can exert excellent water repellent performance and does not absorb water even in a case where the noise damper is exposed to water for a long time to thereby enable the noise damper to be quickly dried by wiping off or the like.

Herein, a volume of the noise damper is an apparent volume determined by an outer shape of the noise damper, including a volume that bubbles inside the noise damper occupy. The term "the entire volume of a tire inner space" is determined as a value V approximately obtained by the following equation (1) in a no load state where a normal inner pressure is provided into an assembly.

$$V = A \times \{(Di-Dr)/2 + Dr\} \times \pi \quad (1)$$

In the equation (1), "A" indicates a tire inner space area obtained by CT scanning of the tire inner space in the normal state, "Di" the maximum outer diameter of a tire inner space in the normal state shown in FIG. 1, "Dr" a rim diameter and "π" a circular constant. The "normal inner pressure" indicates an air pressure determined for each tire in the standard system including standards on which a tire is based: in a case of JATMA, the maximum air pressure; in a case of TRA, the maximum value shown in the table "TIRE LOAD LIMITS AT VARIOUS COLD INFLATION PRESSURES"; and in a case of ETRTO, "INFLATION PRESSURE." In a case where a tire is for an automobile, the normal inner pressure is 200 kPa indiscriminately in consideration of an actual usage frequency.

BRIEF DESCRIPTION OF THE DRAWINGS

FIG. 3 is an enlarged sectional view showing a composite of a tire and a noise damper;

DESCRIPTION OF THE PREFERRED EMBODIMENTS

Description will be given of an embodiment of the invention based on the accompanying drawings as follows.

Figure 1:
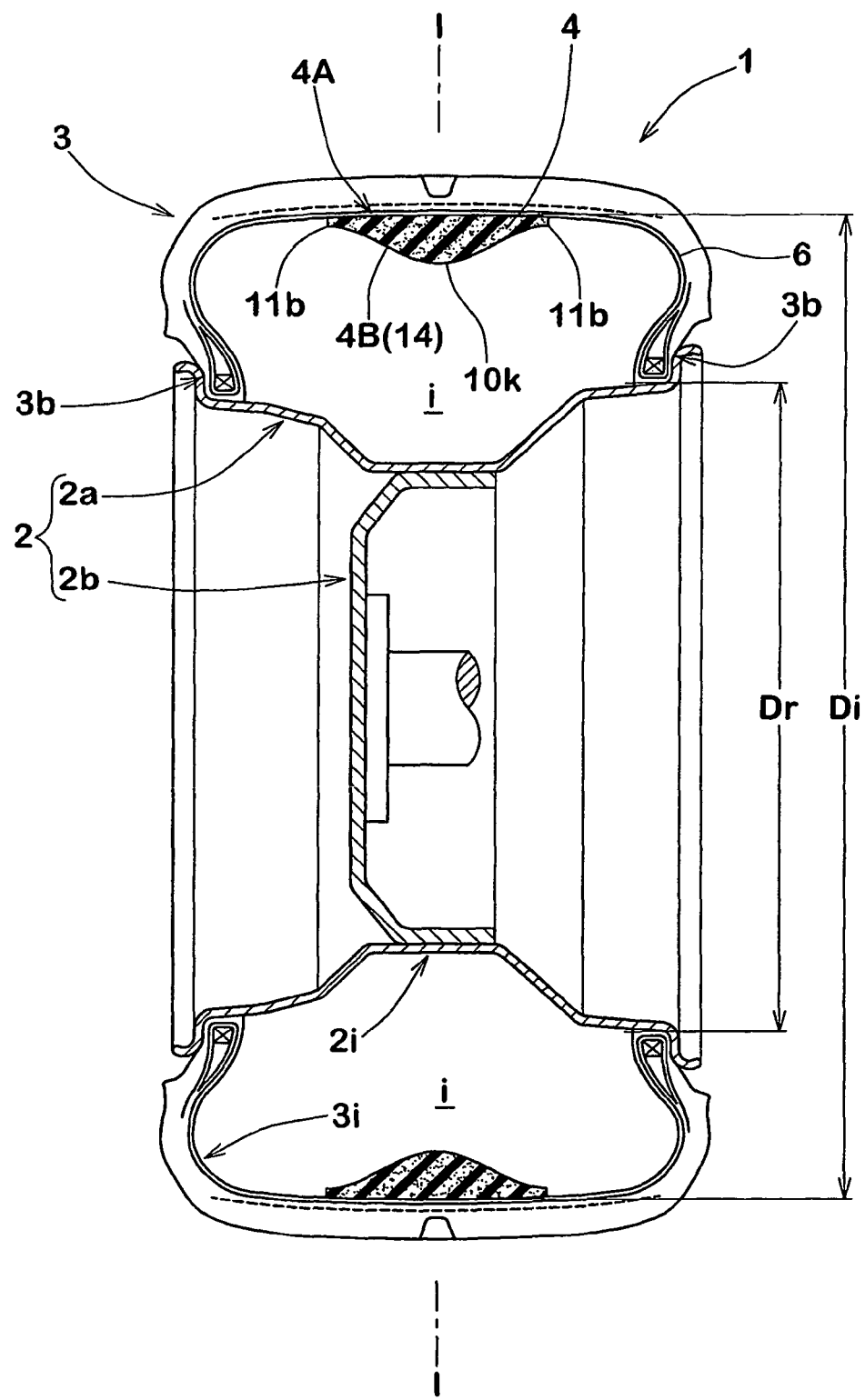
FIG. 1 is a sectional view showing an assembly of a pneumatic tire and a rim of the invention.

An assembly 1 of a pneumatic tire and a rim of the embodiment, as shown in FIG. 1, includes: a rim 2; a tire 3 mounted to the rim 2; and a noise damper 4 disposed in a tire inner space (i) enclosed by the rim 2 and the tire 3.

The rim 2 has a well known structure that includes: an annular rim main body 2a to which a bead portion 3b of the tire 3 is mounted; and a disc 2b fixing the rim main body 2a to an axle. Illustrated in the example is a case where a normal rim defined in the standards such as JATMA is adopted.

The tire 3 is a tubeless tire and, as shown in FIG. 3, has a tread section 3t; a pair of side walls 3s extending inwardly in radial directions of the tire 3 from each end thereof; bead portions 3b located at inward ends of the respective side walls 3s, wherein an inner surface 3i of the tire 3 is covered by an inner liner made of rubber with a low air permeability. With such a construction adopted, an airtight tire inner space (i) is formed with the tire inner surface 3i and a rim inner surface 2i. The tire 3 can be one of various tires without limitations on an internal structure and a category. Preferably adopted, however, is a tire for an automobile in which silence is strongly required in a passenger compartment, especially an automobile radial tire with a aspect ratio of 50% or less.

The tire 3 is reinforced by a cord layer including a carcass 6 extending between the bead portions 3b and 3b and a belt layer 7 provided outside the carcass in the radial direction thereof and in the interior of the tread portion 3t.

The carcass 6 is formed with, for example, one or more organic fiber cords arranged at an angle, for example, in the range of from 70 to 90 degrees relative to the tire circumferential direction: one carcass ply 6A in the example. Both ends of the carcass ply 6A are folded back around bead cores 8. The belt layer 7 is constituted of a plurality of belt plies formed with, for example, steel cords arranged at an angle, for example, in the range of from 10 to 40 degrees relative to the tire circumferential direction: two belt plies 7A and 7B in the example. The belt layer 7 can have higher belt stiffness by intersecting the steel cords between the plies. Note that a known band layer or the like may be provided outside the belt layer 7 when required.

Figure 2:
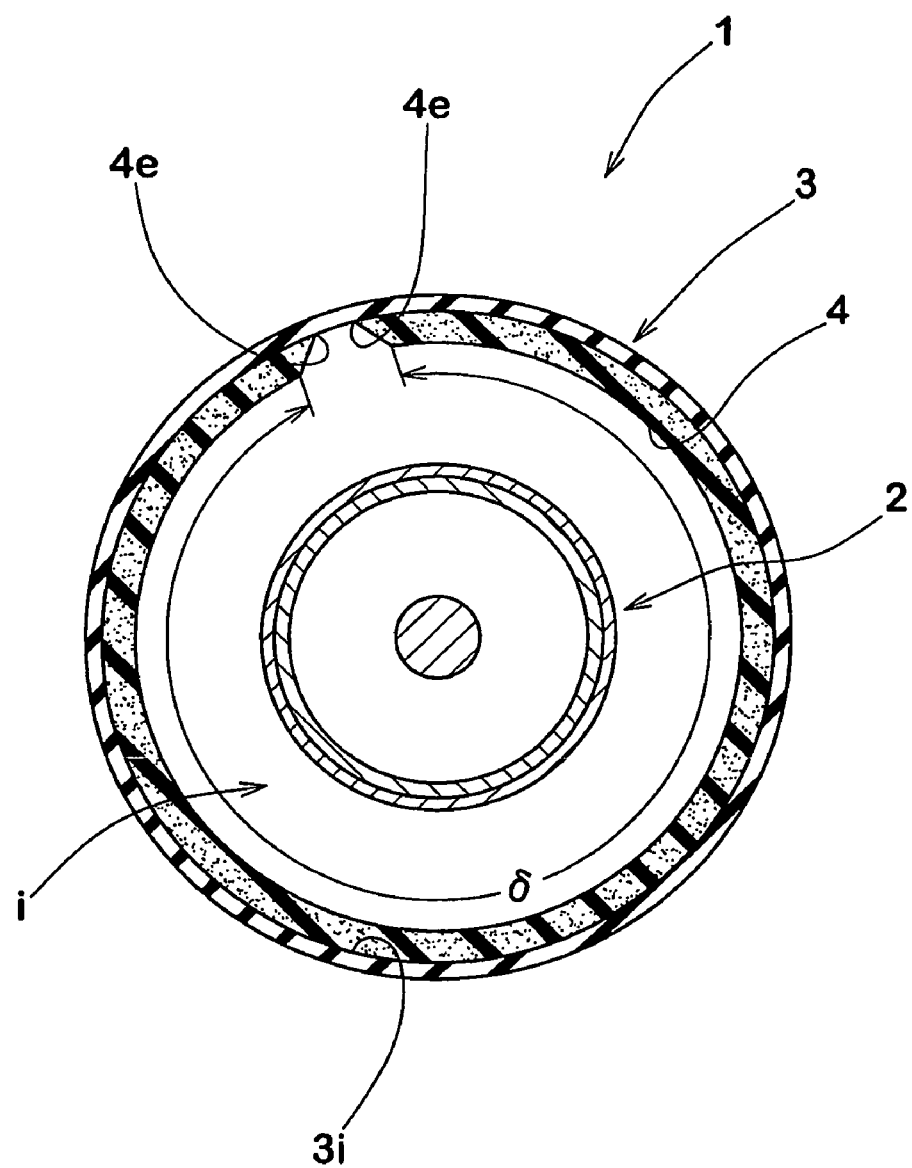
FIG. 2 is a view taken on line I-I of FIG. 1.
Figure 4A:
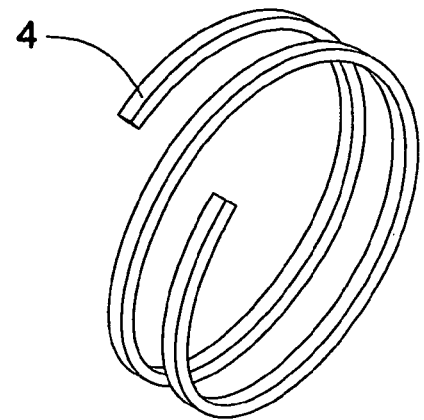
FIGS. 4(A) to 4(C) are perspective views showing other examples of noise damper in a simple way.
Figure 4B:
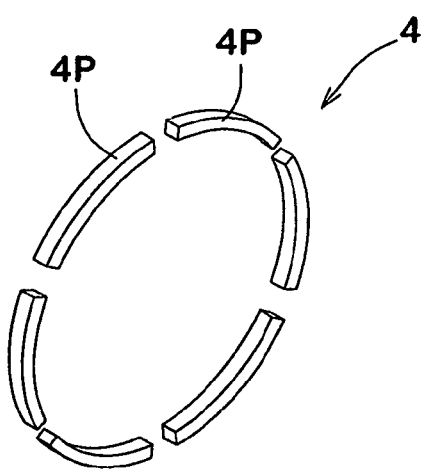
Figure 4C:
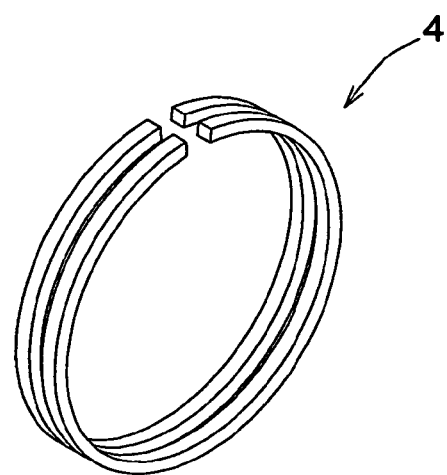

The noise damper 4 has an almost the same sectional form and is in the shape of a long band extending in the tire circumferential direction. The reason for using the term "almost" is that, as shown in FIG. 2, taper portions a height in section of each of which is gradually reduced are formed at each end 4e of the noise damper 4 in the circumferential direction for increasing durability. The band-like noise damper 4 is adhered to the tire inner surface 3i along the circumferential direction with a pressure sensitive adhesive double coated tape or an adhesive. In FIG. 2, there is shown a case where a clearance is formed between ends 4e and 4e of the noise damper 4, while the ends 4e and 4e are connected without leaving a clearance and thereby, the noise damper 4 may be formed as a ring. Besides, the noise damper 4 may also be wound spirally in the tire circumferential direction as shown in FIG. 4(A) and alternatively, as shown in FIG. 4(B), the noise damper 4 is divided into two or more pieces and the pieces 4p are arranged in the circumferential direction with a clearance between adjacent pieces. As shown in FIG. 4(C), the noise damper 4 may also be arranged in a plurality of rows (for example, two rows).

The noise damper 4 is made of a sponge. The sponge is of a sponge-like porous structure and includes: a foam having, for example, continuous bubbles and isolated bubbles obtained by foaming rubber or synthetic resin and in addition thereto, a web-like member obtained by entangling animal fibers, plant fibers, synthetic fibers or the like to couple them into a single piece.

Such noise dampers suppress cavity resonance in the tire inner space (i) and decreases a road noises with the help of porous portions on the surface and in the interior of a sponge. Since a sponge is easy to be deformed, that is contracted or bent, no substantial influence exerts on tire deformation during driving. Hence, driving stability can be prevented from being degraded.

Examples of the sponge that can be preferably adopted include: synthetic resin sponges such as ether-based polyurethane, ester-based polyurethane sponge and polystyrene sponge; and rubber sponges such as chloroprene rubber sponge (CR sponge), ethylene propylene rubber sponge (EDPM sponge) and nitrile rubber sponge (NBR sponge). Among them, preferable is a polyurethane sponge from the viewpoints of silence, light weight, foaming adjustability, durability and the like.

A sponge is easy to cause increase in tire weight if a specific gravity is excessively large, while even if a specific gravity is excessive small, an effect of suppressing cavity resonance is lowered. From such viewpoints, the lower limit of a specific gravity of a sponge is 0.005 or more and preferably 0.01 or more. The upper limit of a specific gravity thereof is 0.06 or less, more preferably 0.04 or less and further more preferably 0.03 or less.

Figure 5:
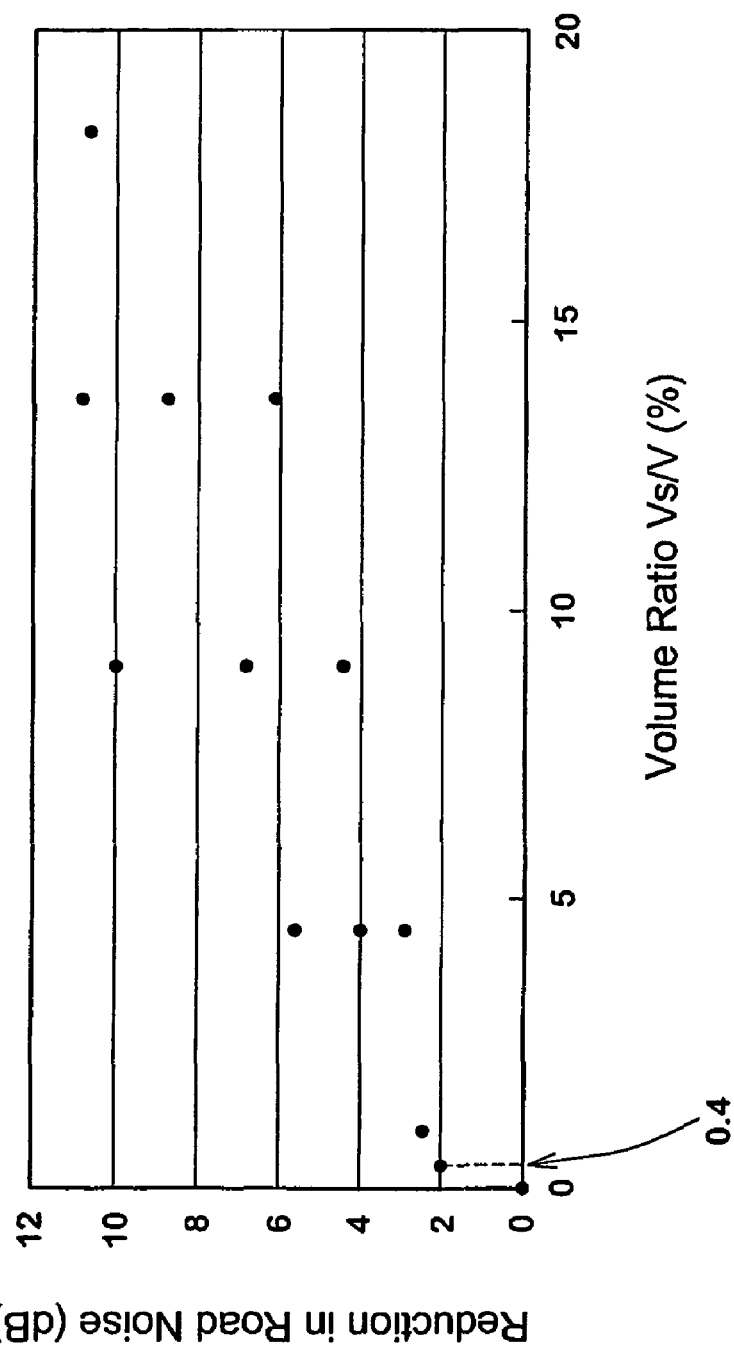
FIG. 5 is a graph showing a relationship between a noise damper volume and a reduction in road noise.

A volume (Vs) of the noise damper 4 is necessary to be in the range of from 0.4 to 20% of the entire volume of a tire inner space (V). In FIG. 5, there is shown empirical results when a load noise is measured with a noise damper 4 arranged in a tire inner space (i). The ordinate is used for plotting reduction in road noise and the abscissa is assigned to a volume ratio (Vs/V). Reduction in road noise is a reduction (dB) from that of an assembly without a noise damper 4 in a tire inner space (i).

As is clear from FIG. 5, by securing a volume of a noise damper 4 to a value of 0.4% or more relative to the entire volume of a tire inner space (i), a road noise reduction effect of about 2 dB or more can be expected. This level of reduction in noise can be said a value recognizable clearly in an automobile compartment. From such a viewpoint, the lower limit of a volume (Vs) of a noise damper 4 is preferably 1% or more, more preferably 2% or more and further more preferably 4% or more of the entire volume (V) of a tire inner space (i). On the other hand, if a volume (Vs) of a noise damper 4 exceeds 20% of the entire volume (V) of a tire inner space (i), not only is an effect of suppression of road noise leveled off, but also a cost is increased or a weight balance of an assembly 1 is degraded with ease. From such a viewpoint, the upper limit of a volume (Vs) of a noise damper 4 is preferably 16% or less and more preferably 10% or less of the entire volume (V) of a tire inner space (V). Note that the results of experiments are obtained in a case where one noise damper 4 is used, while in a case where two rows of noise dampers 4 are used as well, it has been confirmed that a similar effect is exerted as far as all the volume (Vs) is in the numerical value range.

Herein, since a sponge is high in water absorptivity, the sponge absorbs rain or the like during tire storage or assembly of a tire and a rim, which brings a possibility of occurring a problem that adversely affects a weight balance to thereby cause tire vibrations, causes lower durability of the sponge, and induces inner damage of a tire by absorbed water having permeated into rubber of the tire.

Used as a sponge in the example is a water repellent polyurethane obtained by foam curing a mixed composition containing polyisocyanate, polyol, a water repellent and a foaming agent. On this occasion, the polyol is a mixture of polyester polyol and polyester polyether copolymer polyol. With such a construction adopted, a noise damper 4 can exert excellent water repellent performance while a necessary strength and an effect of reduction in road noise are sufficiently secured, thereby enabling various problems such as tire vibrations and tire inner damage caused by the water absorption to be prevented.

A polyurethane sponge is, as is well known, formed by foaming with a foaming agent during a reaction of polyisocyanate and polyol with each other to form a urethane bond in a cross-linked polyurethane.

In this process in the example, water is used as a foaming agent. Water reacts with polyisocyanate in the mixed composition to generate carbon dioxide to thereby enable the cross-linked polyurethane to be foamed. Ordinarily used as a foaming agent is a compound with a low boiling point vaporized by a reaction heat when a urethane bond is formed such as a methylene chloride or pentane. Such foaming agents cause rapid forming with difficulty of control in foaming, leading to not only unevenness in water repellent performance such as inhomogeneity in dispersion of a foaming agent, but also difficulty obtaining a high quality foam uniform in bubble diameter and bubble density. Hence, used in the example is only water which is easy in control of foaming.

A mixing quantity of water is preferably in the range of from 2.5 to 6.0 parts by weight relative to 100 parts by weight of the polyol. If water is less than 2.5 parts by weight, insufficient foaming is resulted, a specific gravity of a sponge is hard to be set low in the range. On the contrary, if water exceeds 6.0 parts by weight, a sponge is foamed excessively, tending to lose a hardness or tearing strength of a sponge. Note that in order to attain sufficient durability, a sponge preferably has a hardness of 30 N or more and a tearing strength of 10N/cm or more. Even if the hardness exceeds 150N, elasticity decreases to tend to lower durability. If a tearing strength increases more than 10N/cm, it results in an excess in terms of quality, which leads to disadvantages of increase in cost and decrease in productivity. Note that a hardness of a sponge is a value measured according to Method A (Section 6.3) of methods for a hardness of Section 6 stipulated in "Testing Method for Soft Urethane foam" of JIS K6400. The tearing strength is a value on a test piece of Shape No. 1 measured according to the measuring method for a tearing strength of Section 11.

Examples of the polycyanate that can be employed include: polycyanates including aromatic polyisocyanates such as tolylene diisocyanate (TDI), diphenylmethane diisocyanate (MDI), polymeric MDI, naphthalene diisocyanate, paraphenylene diisocyanate, xylene diisocyanate (XDI), tetramethylxylene diisocyanate and dimethyldiphenyl diisocyanate; and aliphatic polyisocyanates such as hexamethylene diisocyanate, hydrogenated MDI, isophoronediisocyanate, lysinediisocyanate, hydrogenated XDI and cyclohexyl diisocyanate, and modified compounds thereof. Among them, especially preferable are TDI, MDI and modified compounds thereof.

The polyol in the embodiment is a mixture of polyester polyol and polyester polyether copolymer polyol. This is because a noise damper, by including polyester polyether copolymer polyol, not only can sufficiently secure a necessary strength as a noise damper 4, but also can raise resistance to hydrolysis. Besides, this is because a noise damper, by including polyester polyol, not only can enhance dispersibility of a water repellent, but also renders adjustment in viscosity of a mixed composition easy to enable a foam low in viscosity (low specific gravity) to be obtained.

If a proportion of a polyester polyol is excessive low, compatibility between a water repellent and a polyester polyether copolymer polyol is deteriorated to cause insufficient agitation, which results in not obtaining a desired foam in which a water repellent is uniformly dispersed. Contrary thereto, if a proportion of polyester polyol is excessively large, no ether chain is incorporated in a cross-linked polyurethane; therefore, a foam tends to reduce a strength and lose resistance to hydrolysis. Hence, it is preferable that a proportion of a polyester polyol is in the range of from 3 to 60% by weight and a proportion of polyester polyether copolymer polyol is in the range of from 97 to 40% by weight as a balance.

On this occasion, a mixing quantity of a water repellent is preferably in the range of from 25 to 80 parts by weight relative to 100 parts by weight of polyol. If a mixing quantity of a water repellent is less than 25 parts by weight, water repellent performance becomes insufficient, while on the contrary, if a mixing quantity of a water repellent exceeds 80 parts by weight, it becomes difficult to produce a foam since the water repellent acts as a plasticizer as well.

Note that in order to enhance a strength, a resistance to hydrolysis, water repellent performance, moldability in good balance, it is preferable that in polyol, a proportion of polyester polyol is in the range of from 15 to 35% by weight, polyester polyether copolymer polyol is in the range of from 85 to 65% by weight as a balance and a mixing quantity of a water repellent is in the range of from 30 to 50 parts by weight relative to 100 parts by weight of polyol.

Herein, examples of the polyester polyol that can be named include: a compound obtained by condensing a low-molecular polyol and a carboxylic acid and in addition thereto, lacton-based polyol such as ε-caprolacton ring opening polymerization product and β-methyl-δ-valerolacton ring opening polymerization product. Examples of the low-molecular polyol that can be named include: ethylene glycol, diethylene glycol, propylene glycol, 1,4-butanediol, 1,6 hexanediol, 2,5-hexanediol, 3-methyl-1,5-pentanediol, neopentyl glycol, glycerin, trimethylolpropane, trimethylolethane, pentaerythritol, diglycerin, sorbitol, cane sugar and the like. Examples of the carboxylic acid that can be named include: succinic acid, adipic acid, maleic acid, fumaric acid, phthalic acid, isophthalic acid, succinic anhydride, maleic anhydride, phthalic anhydride and the like.

The polyester polyether copolymer polyol can be a known product. There can be exemplified a compound obtained by esterification reaction (or ester exchange reaction) of an aliphatic dicarboxylic acid (or an ester forming derivative thereof) and a low-molecular diol to subject a product of the reaction to a polycondensation. Or alternatively, there is exemplified a compound obtained by ester exchange reaction of polyester polyol and a polytetramethylene glycol. In the invention, polyester polyether copolymer polyol is employed to thereby increase a strength of a foam, improve resistance to hydrolysis and exert good water repellency.

A water repellent described above that can be preferably used is an ester, which is a coupled compound of a monoalcohol having 14 to 36 carbon atoms and an aliphatic dicarboxylic acid (or an alicyclic dicarboxylic acid) having 14 to 36 carbon atoms. If the number of carbon atoms is 14 or more, hydrophobicity that a long chain alkyl group has can effectively contribute to water repellency of a foam. If the number of carbon atoms is excessively large, a water repellent becomes easily a sold at room temperature or a low temperature to make it to be hard to be handled. Therefore, the upper limit of the number of carbon atoms is preferably 36 or less.

Examples of such esters includes:
(a) isostearyl stearate,
(b) oleyl stearate,
(c) stearyl oleinate,
(d) dioleyl dimerate,
(e) distearyl dimerate and
(f) a diester of a mixture of a dimer acid and a high-molecular alcohol having 32 to 36 carbons.

Note that a catalyst and a foam control agent ordinarily used in formation of polyurethane sponge can be mixed into the mixed composition in a similar way as conventional.

Not only does water repellent polyurethane sponge obtained by foam curing such a mixed composition secure sufficiently a mechanical strength necessary as a noise damper 4, but also resistance to hydrolysis can be raised and water resistance can be improved. Since a water repellent is incorporated and dispersibility thereof is increased to achieve more of homogeneity, an excellent water repellent performance is exerted, thereby enabling various problems such as tire vibrations and tire inner damage caused by absorption of water into a sponge to be prevented. Besides, a sponge with a lower density (lower specific gravity) can be achieved while such characteristics are sustained, thereby enabling a high road noise reduction effect to be exerted.

Then, the noise damper 4, as shown in FIG. 3, has a bottom surface 4A fixed to the tire inner surface 3i or the rim inner surface 2i; and an upper surface 4B facing the center of the tire inner space (i) located on the other side of the noise damper 4 from the bottom surface 4A. The bottom surface 4A prevents the noise damper 4 from freely moving in the tire inner space (i) during driving to prevent the noise damper 4 from being damaged and to be useful for exerting an effect of resonance suppression. Note that the bottom surface 4A is a substantially smooth flat surface.

Herein, the rim inner surface 2i has a chance that the bead portion 3b is strongly pressed thereto when tires are exchanged. Hence, the noise damper 4 is fixed preferably to the tire inner surface 3i, especially to a tread inner surface 3ti. Note that the tread inner surface 3ti means a surface located in the tread portion 3t brought into contact with a road surface. In the specification, the tread inner surface includes the width region TW disposed in the tire axial direction in which at least the belt layer 7 is included. As a preferred embodiment, the noise damper 4 is fixed so that the width center of the bottom surface 4A is located at a tire equator C. The noise damper 4 more preferably has an arrangement and a sectional shape bilaterally in symmetry with respect to the tire equator C as a center.

Figure 6:
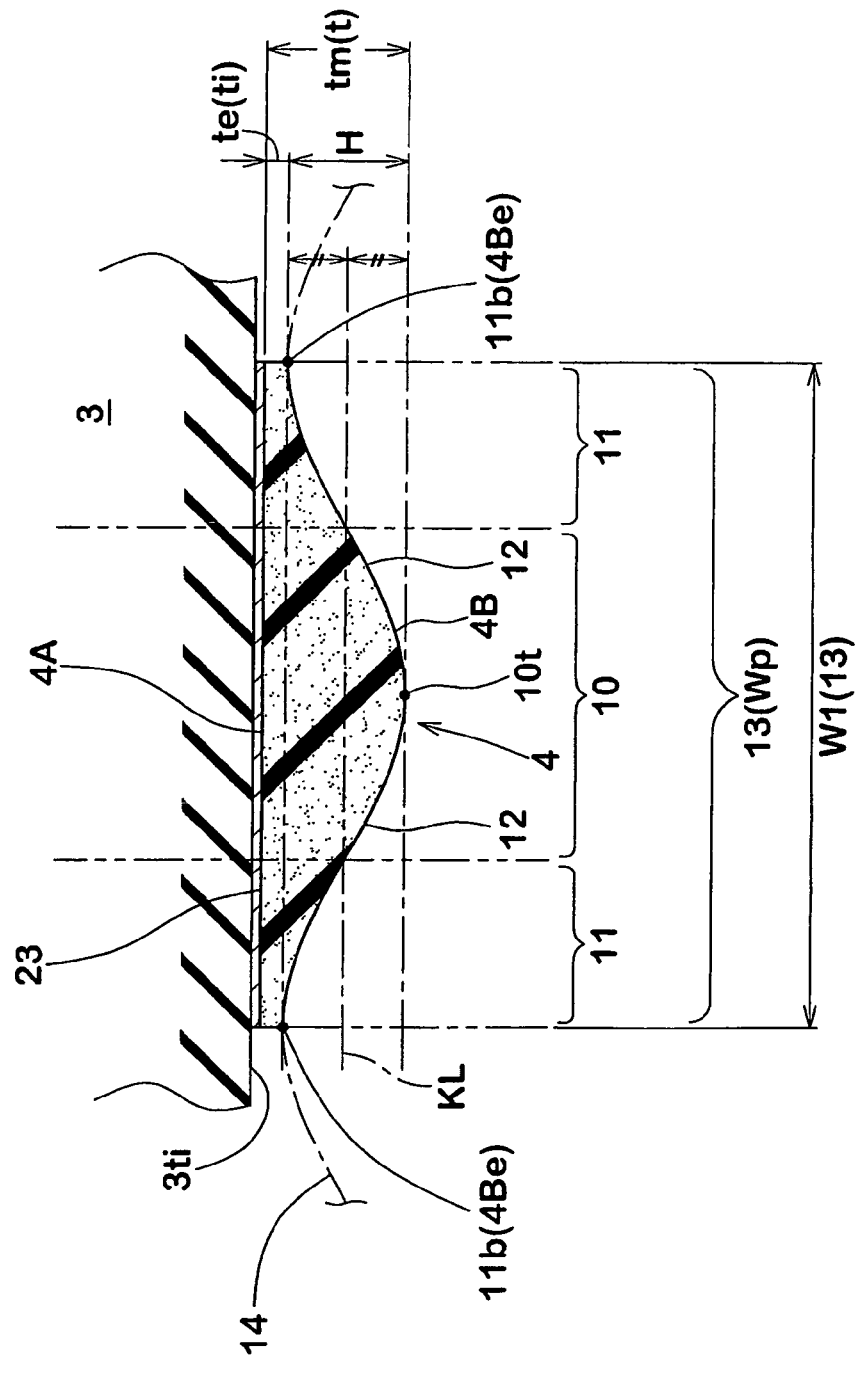
FIG. 6 is an enlarged view of a noise damper of a first embodiment.

The noise damper 4, as shown in FIG. 6, preferably has the maximum value (tm) of a thickness from the bottom surface 4A to the upper surface 4B in the range of from 5 to 45 mm in the tire meridian section including the tire axis and is formed in the shape of a laterally long, flat section with a width W1 of the bottom surface 4A more than the maximum value (tm) of a thickness. The maximum value (tm) of a thickness and the width (W1) are measured in a state where the noise damper 4 is mounted to the tire 3 and the tire is not assembled with the rim (at an ordinary temperature under an ordinary atmospheric pressure). The maximum value (tm) of a thickness is measured in a direction perpendicular to the bottom surface 4A and the width W1 is measured along the bottom surface 4A.

Figure 22:
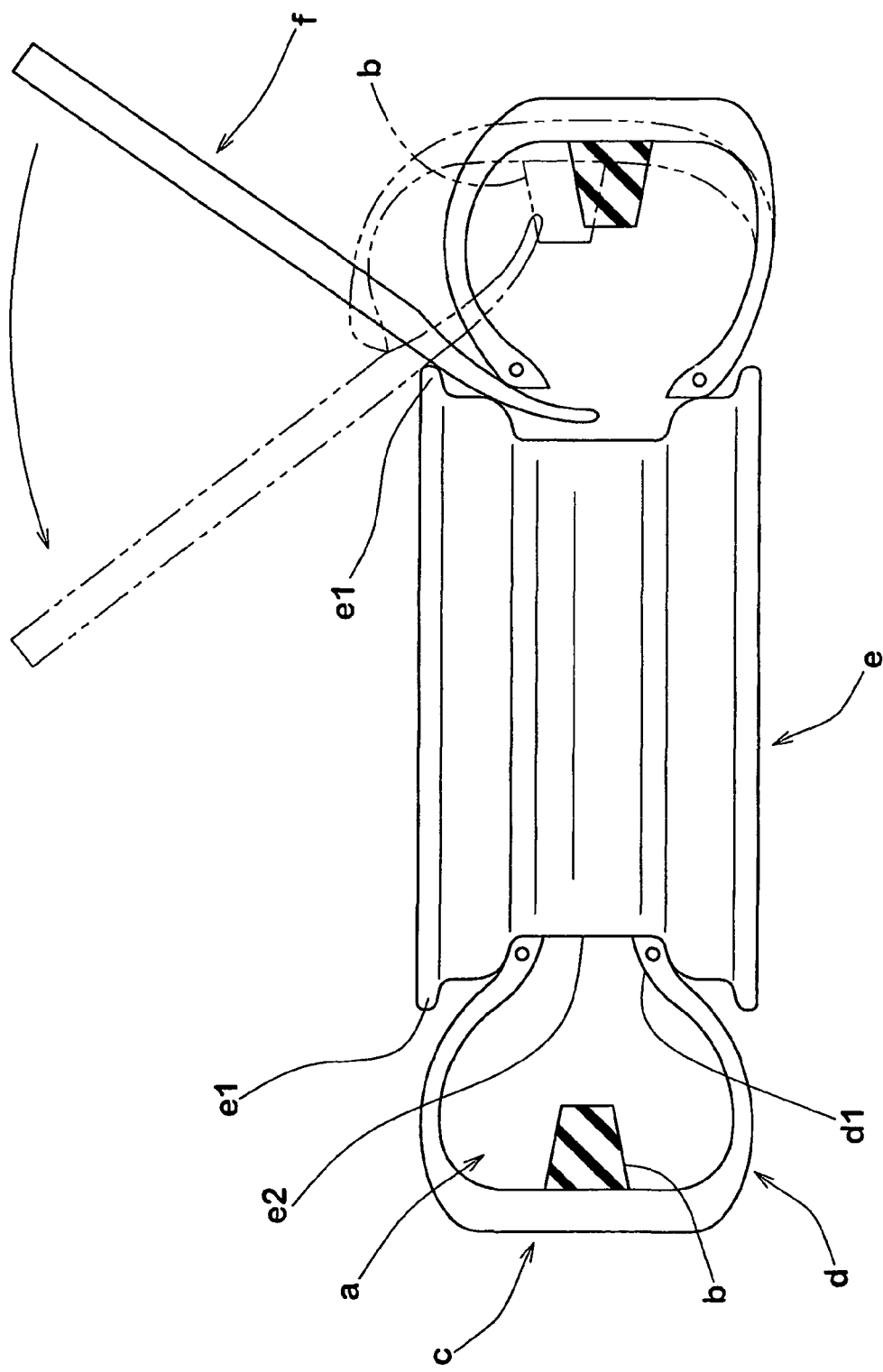
FIG. 22 is a sectional view describing operations in demounting a tire from a rim using a tire lever.

The inventors conducted a tire demounting test on an assembly having a noise damper 4 in the sectional shape of a rectangle placed on the tread inner surface 3ti. A breakage state of the noise damper 4 was investigated. The tire demounting test was performed, as shown in FIG. 22, by more than one workers using a tire changer (not shown) and a tire lever (f). The workers have no knowledge of the presence of the noise damper in advance. Various noise dampers with different maximum thicknesses (tm) and various kinds of tires with different aspect ratios are employed in assemblies of samples.

When the tire 3 is demounted from the rim 2, the tire lever (f) is inserted into the tire inner space (i) and a length of insertion is different so as to be adaptable according to a kind of a tire (a category, an aspect ratio or the like), or a technique and a habitual practice of a worker. As a result of the test, it was found, however, that assemblies each having a noise damper with the maximum value of a thickness (tm) limited in the range of from 5 to 45 mm decrease the number of broken noise dampers. The reason why is considered that a length of insertion of the tire lever (f) is restricted by a general understanding of workers intending to prevent contact of a tire lever (f) with the a inner surface 3i; therefore, a length of insertion of the tire lever (f) is restricted and a chance of contact with noise dampers is less in a case where a noise damper with a smaller thickness is used. Especially flat tires each with an aspect ratio of 50% or less showed a tendency of frequent contact with side surfaces of noise dampers by a tire lever (f).

Therefore, further experiments were conducted with the resulted findings as follows: Damage to be caused by a tire lever (f) can be avoided with the following construction adopted: in the tire meridian section, as shown in FIG. 6, (1) the upper surface 4B extends along a wavy curve 14 that is repetition of a wavy element 13 in the width direction which is constituted of a hill top portion 10t having the maximum value (tm) in thickness (t), valley bottom portions 11b having the minimum value (ti) in thickness (t) on each side of the hill top portion and slope portions 12 extending down to the respective valley bottom portions 11b from the hill top portion 10t, (2) each end 4Be in the width direction of the upper surface 4B is terminated at the valley bottom portions 11b or the slope portions 12, and (3) a thickness (te) between the each end 4Be in the width direction of the upper surface 4B and the bottom surface 4A is in the range of from 1.0 to 15.0 mm.

In other words, the upper surface 4B extends along the wavy curve 14 to thereby form a hill top portion 10 with a larger thickness (t) and a valley portion 11 with a smaller thickness (t) alternately. Not only is each end of the noise damper 4 terminated at the valley portions 11, but a thickness (te) of each end from the bottom surface 4A is restricted to a value in the range of from 1.0 to 15.0 mm. Note that not only is the hill top portion 10 defined as a portion with a larger thickness (t) above an amplitude center line KL of the wavy curve 14 as a reference, but the valley bottom portion 11 is also defined by a portion with a smaller thickness (t) below the amplitude center line KL.

In FIGS. 1 to 10, there is shown a case where the wavy curve 14 is of a sine wave as the first embodiment of the noise damper 4.

Figure 7:
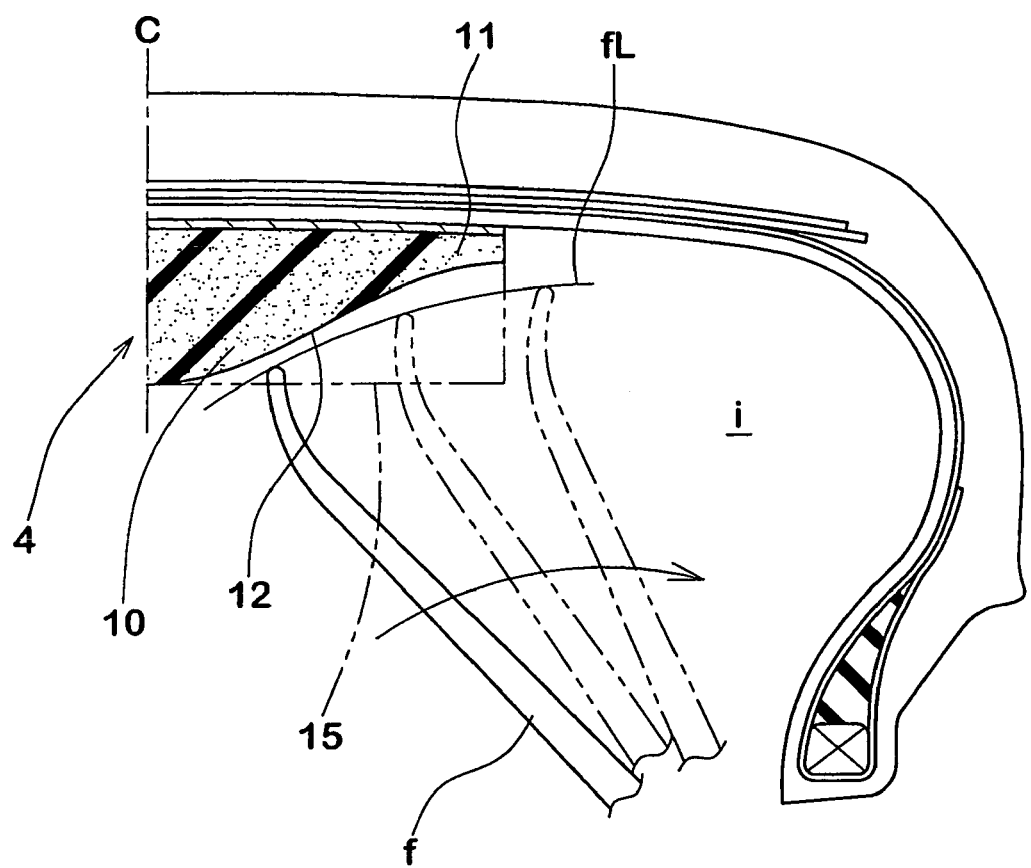
FIG. 7 is a partly sectional view describing a positional relationship between the noise damper of the first embodiment and a tire lever.

Not only is each end of the noise damper 4, in this way, terminated at the valley portions 11, but a thickness of each end (te) is restricted to 15.0 mm or less. Therefore, contact of the tire lever with the noise damper 4 is avoided at a more limited chance. The noise damper 4 is profiled by the gradual slope portions 12 from each end to the hill top 10t. Adoption of such a slope 12 eliminates, as shown in FIG. 7, a portion 15 easily interfering with the lever (f). Therefore, contact of the tire lever (f) with the noise damper 4 is avoided at a further more limited chance. The slope portion 12 approximates an circular arc-like locus (fL) depicted by the distal end of the tire lever (f). Hence, even if the tire lever (f) was brought into contact with the noise damper 4, a frictional force between the tire lever (f) and the slope portion 12 would be small to thereby render a thrust of the distal end of the tire lever (f) into the noise damper 4 difficult. With the smaller frictional force and difficulty in a thrust thereinto combined, extreme damage on the noise damper 4 and separation thereof from the tire 3 can be effectively prevented.

Note that if a thickness (te) of each end exceeds 15.0 mm, each end of the noise damper 4 and the tire lever (f) interfere easily with each other. Hence, the thickness (te) is preferably 15.0 mm or less, more preferably 10.0 mm or less and further more preferably 7.0 mm or less from the viewpoint of prevention of damage on the noise damper 4. If the thickness (te) is less than 1.0 mm, an effect of increase in productivity is harder to be achieved, and accordingly, the thickness (te) is preferably 1.0 mm or more, more preferably 3.0 mm or more, and further more preferably 4.0 mm or more. Detailed description will be given in this regard later.

The minimum thickness value (ti) is preferably 1.0 mm or more, more preferably 3.0 mm or more and further more preferably 4.0 mm or more from the viewpoint of increase in productivity. It is especially preferable that the thickness of the each end (te) is equal to the minimum thickness value (ti), that is each end of the noise damper 4 is terminated at the valley bottom portion 11b from the viewpoints of prevention of damage of the noise damper 4 and increase in productivity thereof. As far as the thickness range is adopted, a thickness (te) may be more than the minimum value (ti), that is the each end or one end of the noise damper 4 may be terminated at a point on the slope portion 12, which is different from the valley bottom portion 11b.

In connection with the wavy curve 14 determining a profile of the upper surface 4B, if the amplitude H is excessively small, the surface area of the upper surface 4B becomes small to thereby lower a resonance suppression effect in the tire inner space (i) with ease, while if the amplitude H is excessively large, the slope portion becomes steep, which affects prevention of damage on the noise damper 4 adversely. From such a viewpoint, the lower limit value of the amplitude H is preferably 4 mm or more, more preferably 8 mm or more, and further more preferably 10 mm or more, while the upper limit value of the amplitude H is preferably 44 mm or less, more preferably 40 mm or less, and furthermore preferably 35 mm or less. Note that in a case where the wavy curve 14 is of a sine wave, a ratio of the amplitude H and a wave width Wp, which is a width of the wavy element 13, H/Wp is preferably 0.3 or less and more preferably 0.25 or less in order to approximate the slope portion 12 to the locus (fL) of the tire lever (f).

In FIGS. 1, 3, 6 and 7, there is shown a case of a mode having one hill top portion 10t on the upper surface 4B of the noise damper 4, especially, with each end of the noise damper 4 terminates at the valley bottom portions 11b, that is a case where the upper surface 4B is formed with one wavy element 13. Two or more hill top portions 10t on the upper surface 4B may be adopted and in FIG. 8, there is shown a mode having the upper surface 4B including two wavy elements.

In a case where the number of the hill top portions lot is 2 or more, a higher resonance suppression effect can be exerted because of increase in surface area of the upper surface 4B. A valley portion 11 is formed between hill top portions 10. The valley portion 11 makes it easier to deform the hill portion 10 in the width direction when the tire lever (f) is brought into contact with the slope portion 12. Hence, the noise damper 4 can escape from the tire lever (f) and a thrust of the tire lever (f) can be suppressed to a smaller depth. The valley portion 11 is useful for preventing thermal breakage of the noise damper 4 because of exertion of a heat release effect.

Note that since the volume (Vs) of a noise damper 4 is limited to the range relative to the entire volume (V) of the tire inner space (i), a sectional area of the noise damper 4 is also determined if a length of the noise damper 4 in the circumferential direction is determined. The width W1 of the bottom surface 4A is automatically determined in the presence of a limitation such as the maximum thickness value (tm) and by determining a profile of the wavy curve 14. If the width W1 of the bottom surface 4A is excessively large, the working efficiency in attaching the noise damper to the tire inner surface 3i tends to be decreased. From such a viewpoint, in a case where the tire 3 is a radial tire for an automobile, a width W1 of the bottom surface 4A is preferably in the range of from 30 to 250 mm and more preferably in the range of 60 to 140 mm. A width W1 of the bottom surface 4A is also preferably in the range of from 5 to 100% and more preferably in the range of from 20 to 70%, of a tread width TW.

The noise damper 4 can be fixed to the tire inner surface 3i or the rim inner surface 2i in various kinds of ways. From the viewpoints of cost and operability, preferable is adhesion with an adhesive or a pressure sensitive adhesive double coated tape 23, especially preferable is adhesion with the pressure sensitive adhesive double coated tape 23. Various methods other than adhesion can be adopted, for example a method using a screw or a mounting metal tool, a method for integrating them into one piece in a vulcanization process and the like. Then, the noise damper 4 is fixed to the pneumatic tire 3, which can be sold as a composite of the pneumatic tire 3 and the noise damper 4 in the form of a set sale. It is desired to finish the tire inner surface 3i to be smooth in order to improve of adhesion. While protrusion stripes are usually formed on the tire inner surface 3i by transfer of exhaust grooves formed on a bladder for vulcanization molding, it is preferable to remove the protrusion stripes by smoothing in polishing. Alternatively, a bladder without exhaust grooves on the surface thereof can also be used to thereby finish the tire inner surface as finished to be flat and smooth. It is preferably for the tire to be vulcanization molded without coating a release agent on the tire inner surface 3i in order to further better adhesion to the tire inner surface 3i.

Description will be given of a preferred method for forming a noise damper 4 of the first embodiment having the wavy curve 14 in the profile of a sine wave.

Figure 9A:
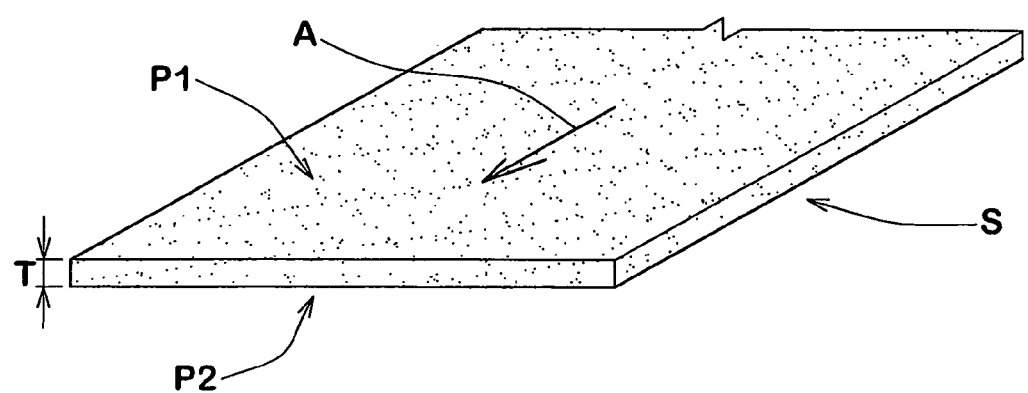
FIGS. 9(A) to 9(D) are perspective views describing a method for manufacturing a band-like member of the first embodiment.
Figure 9B:
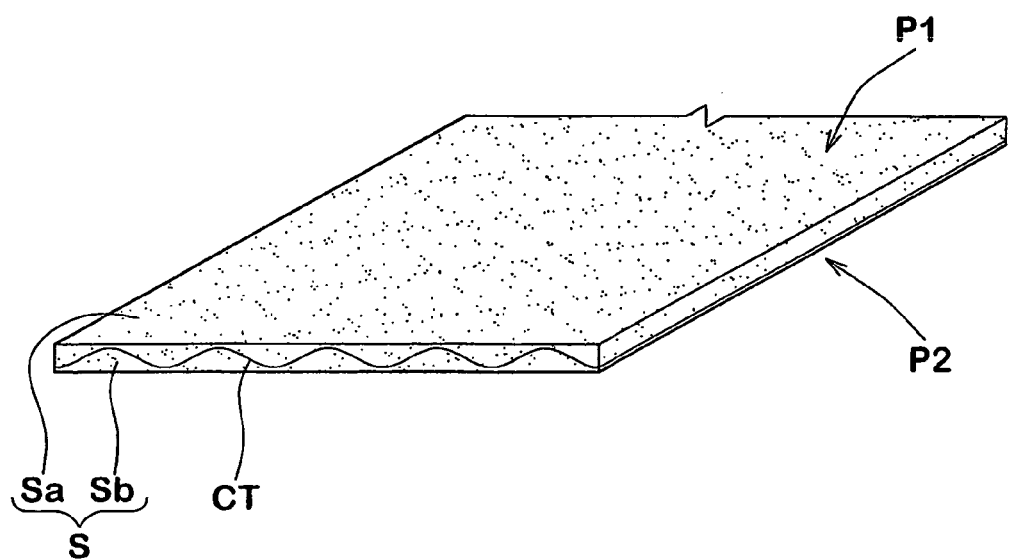
Figure 9C:
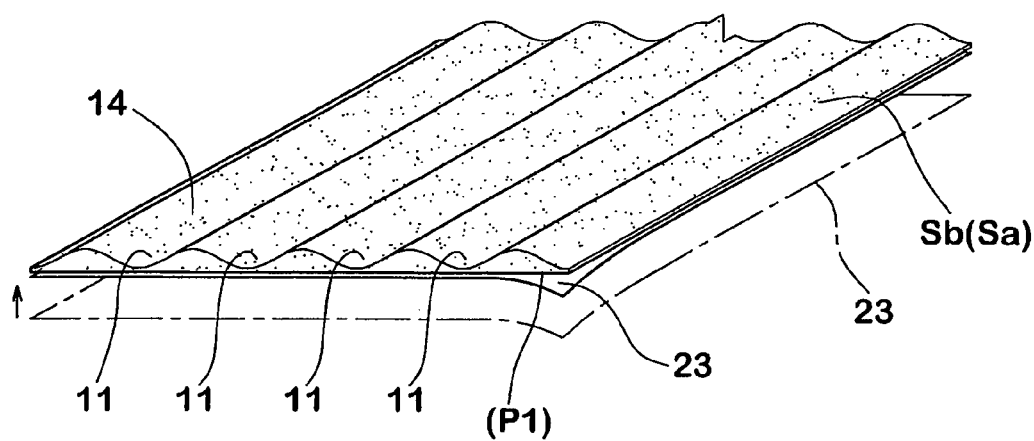
Figure 9D:
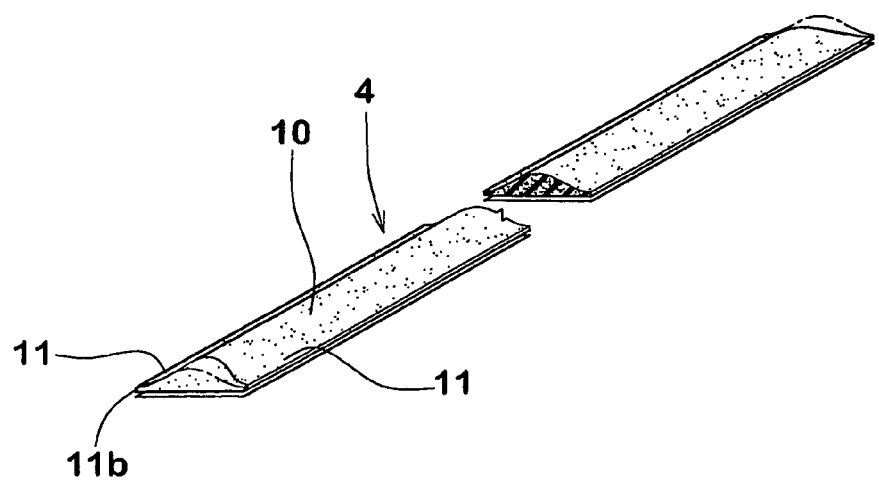
Figure 10A:
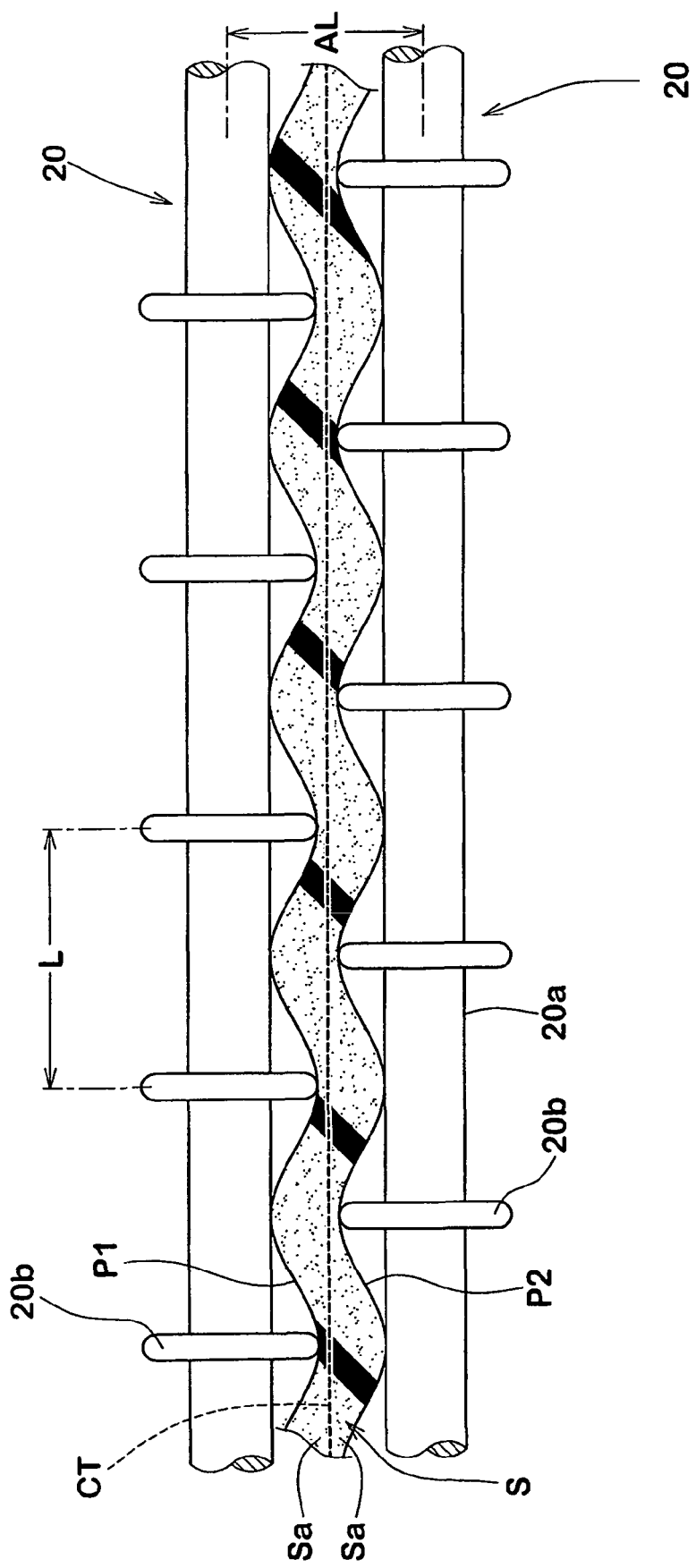
FIG. 10(A) is a sectional view describing a deformation step and a cutting step and FIG. 10(B) is a sectional view of a sponge after the cutting step.
Figure 10B:
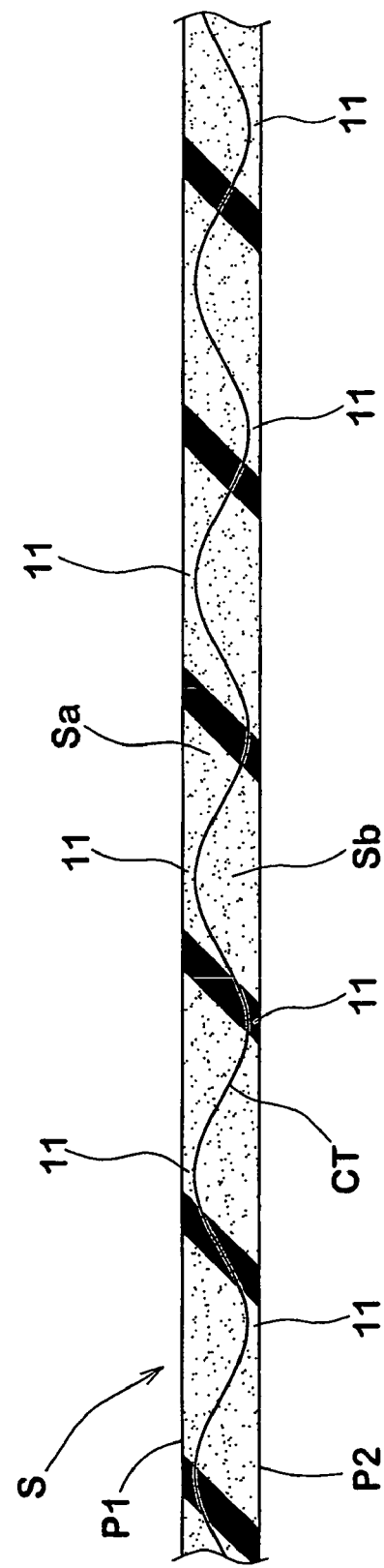

The molding method includes a transport step of feeding a sponge (S) (FIG. 9(A)); a deformation step of bend deforming the transported sponge (S) in the profile of a sine wave (FIG. 10(A)); a cutting step of slicing the deformed sponge (S) into two half sponges (Sa and Sb) along a horizontal cutting plane (FIGS. 10(A) and 10(B)); and division step of dividing the half sponges (Sa and Sb) along the length direction to thereby obtain a plurality of noise dampers 4 (FIGS. 9(C) and 9(D)).

In the transport step, as shown in FIG. 9(A), a flat plate-like sponge (S) having a first surface (P1) and a second surface (P2) substantially parallel to each other is fed in the length direction (A) perpendicular to the thickness direction (T). The transport step can be implemented with ease using, for example, a belt conveyor or the like. Note that the thickness (T) is equal to the sum (tm+ti) of the maximum thickness value (tm) and the minimum thickness value (ti).

In the deformation step, as shown in FIG. 10(A), the fed sponge (S) is pressed alternatively from the first surface (P1) and the second surface (P2) to each other in a section in the width direction perpendicular to the length direction (A). Thereby, the sponge (S) is deformed into the profile of a sine wave corresponding to the wavy curve 14. In the deformation step, employed are shafts 20 and 20 held at two levels, upper and lower, and parallel to each other. Each roller 20 is constituted of a shaft 20a freely rotatably supported and a plurality of rolling body 20b mounted concentrically with the shaft 20a. The rolling body 20b each are in the shape of a disc and the discs are all equal in outer diameter and disposed with an equal pitch (L) in the axial direction. Note that an outer surface of a rolling body 20b is chamfered in the profile of a circular arc.

The rolling body 20b of the upper roller 20 and the rolling body 20b of the lower roller 20 are shifted relative to each other in the axial direction by a length of a half of the pitch (L). That is, the rolling body 20b are arranged alternately above and below the sponge (S) at a pitch of L/2 in the axial direction. Therefore, when the sponge (S) passes through clearances between the rollers 20 and 20 at two levels, upper and lower, the sponge (S) is pressed alternately by the rolling body 20b, upper and lower to deform the sponge (S) into the profile of a sine curve.

In the cutting step, as shown in FIG. 10(A), the sponge (S) deformed into the profile of a sine wave is sliced along a flat cutting plane (CT) continuously extending in the width direction between the first surface (P1) and the second surface (P2) into two half sponges (Sa and Sb). The two half sponges (Sa and Sb) are, as shown in FIG. 10(B), discharged from the rollers 20 and 20, and the cutting plane (CT) assume the profile of a sine wave in a state where the pressing pressure is removed, the cutting plane (CT) of the upper half sponge (Sa) is a reversal of that of the lower half sponge (Sb) and the first and second surfaces (P1 and P2) restore to flat surfaces. Such a forming method is also called a profile method.

In this way, in the deformation step and the cutting step combined, two half sponges (Sa and Sb) in the same profile of a sine wave can be efficiently formed in a single cutting from one sponge (S). Note that the spacing AL between the rollers 20 and 20 is set so that the cutting plane is not brought into contact with the upper or lower rolling body 20b. In the cutting step, preferably used is a cutting blade capable of mechanically cutting a sponge at an ordinary temperature, for example a split blade, but a heat cutting using a high temperature wire is not preferable since the surface of a sponge is melted to thereby tend to degrade a noise absorption effect.

In the example, as shown in FIG. 9C, performed is a pressure sensitive adhesive double coated tape adhering step of adhering one surface of the pressure sensitive adhesive double coated tape 23 onto the first and second surfaces (P1) and (P2) of the half sponges (Sa and Sb). In this step, one pressure sensitive adhesive double coated tape with a large width is adhered to each of the surfaces (P1 and P2) to cover almost all the surface thereof.

In the division step, as shown in FIGS. 9(C) and 9(D), the half sponges (Sa and Sb) on each of which the pressure sensitive adhesive double coated tape 23 is adhered is cut along the length direction A together with the pressure sensitive adhesive double coated tape 23 at positions each corresponding to the valley portion 11 smaller in thickness (t) and preferably at a positions each corresponding to the valley bottom portion 11b. Thereby, the half sponges (Sa and Sb) are divided into the plurality of noise dampers 4. Note that a length along the length direction A of the noise damper 4 is preferably adjusted so as to be adapted for a tire size in the state of a sponge (S) in advance, while a cutting step or the like of adjusting a length thereof can also be applied properly to each noise damper 4 after the division step. Each noise damper 4 can also be formed properly so as to have a taper portion at each end.

Figure 8:
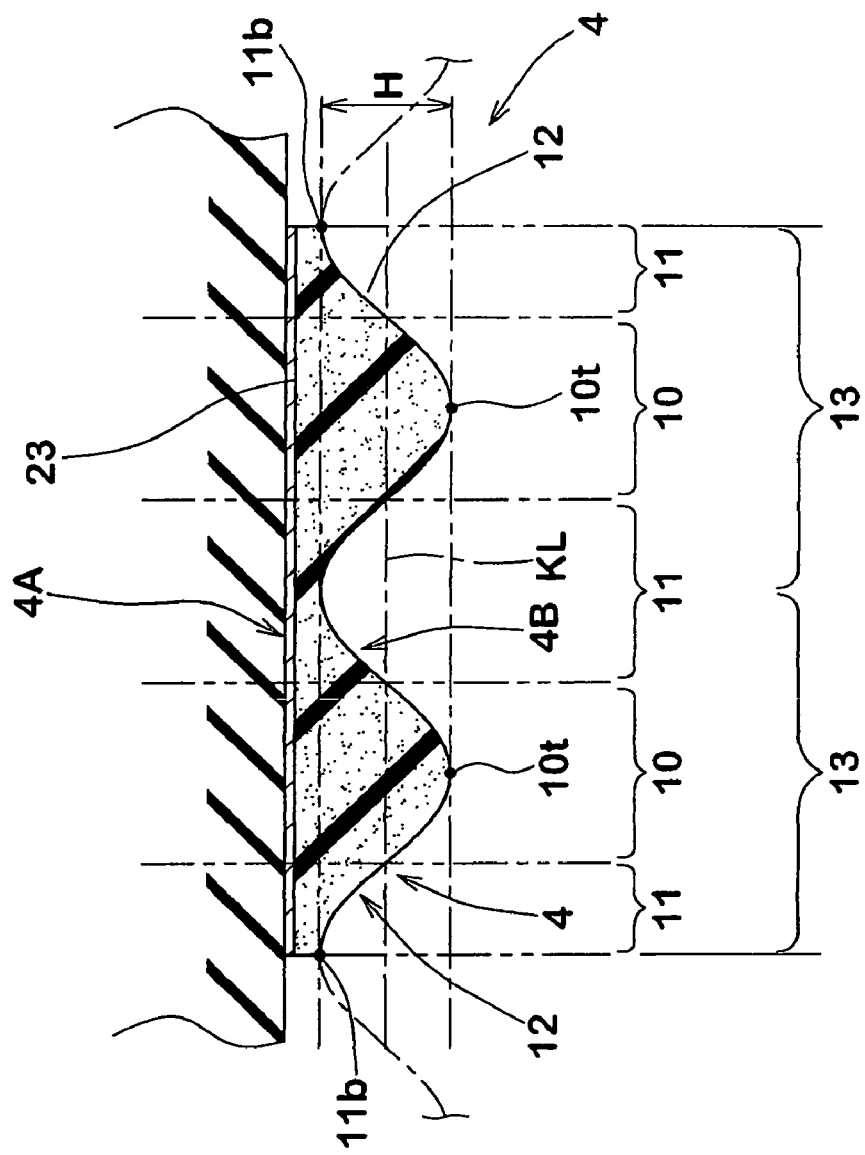
FIG. 8 is a sectional view showing another example of the noise damper of the first embodiment.

In the formation method, the plurality of noise dampers 4 in substantially the same shape can be produced in this way with good efficiency. Therefore, not only is a productivity improved, but generation of waste material is also suppressed to thereby raise a yield in terms of material. Besides, every second valley portion 11 is only required to be cut in order to obtain a noise damper 4 having, for example, two hill tops 10 (FIG. 8).

Herein, in a case where the minimum thickness (ti) is less than 1.0 mm, a possibility is encountered that the valley portions 11 is broken at the stage of obtaining half sponges, which cause reduced productivity due to degradation of workabilities in later steps. Hence, the minimum thickness value (ti) is preferably 1.0 mm or more, more preferably 3.0 mm or more and further more preferably 4.0 mm or more.

In the example, the sponge (S) is deformed into the profile of a sine wave in the deformation step, followed by cutting, while, for example, a blade is moved along the profile of a sine wave in a state where the sponge (S) may be maintained in the initial shape of a flat plate to thereby slice the sponge (S) adopting a so-called contour forming. Half sponges obtained by slicing can be formed into noise dampers 4 by way of operations similar to those in the example.

Figure 11:
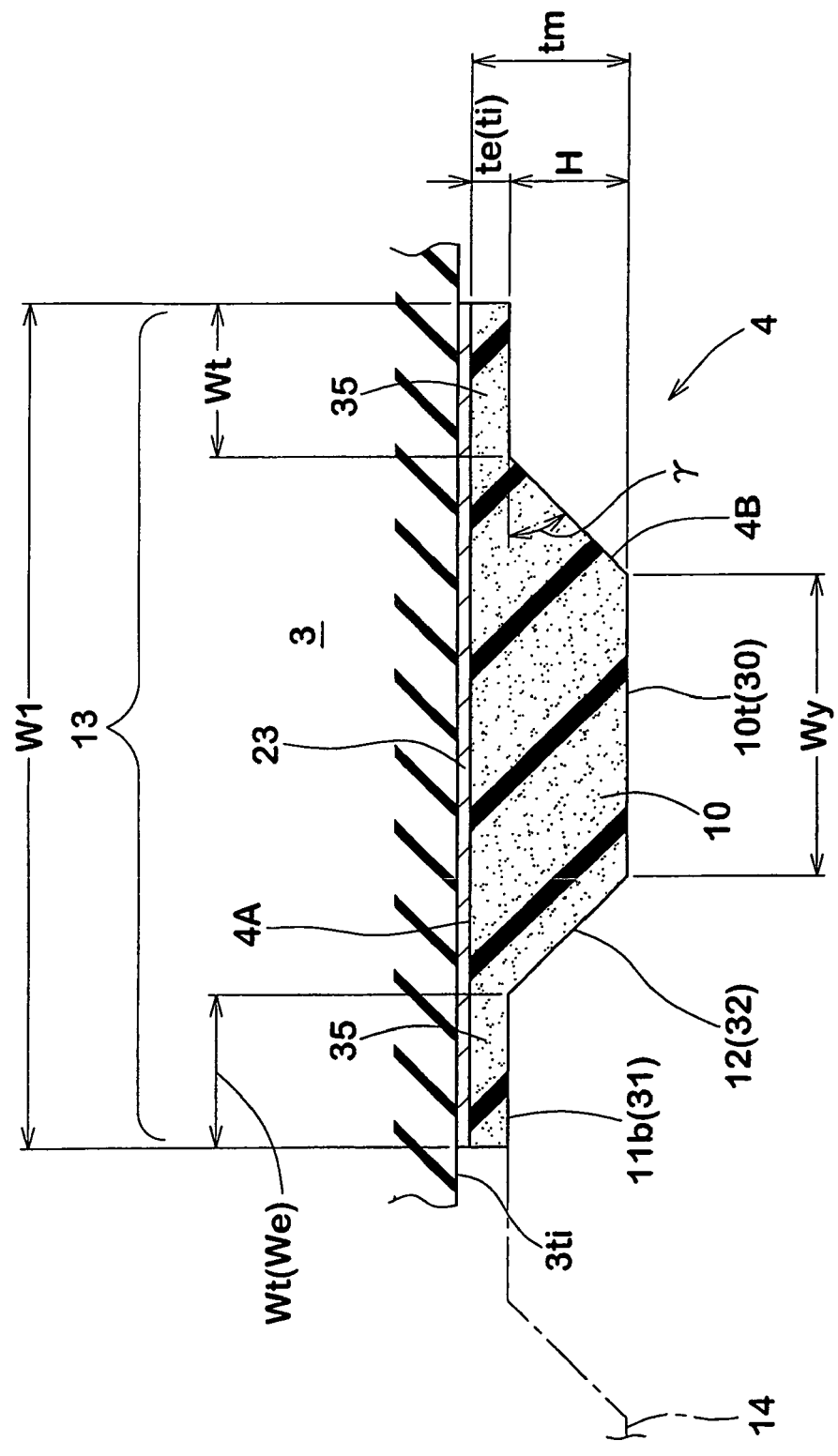
FIG. 11 is an enlarged view of a noise damper of a second embodiment.

Then, in FIGS. 11 to 15, there is shown a case where the wavy curve 14 is in the profile of a trapezoid as a second embodiment of the noise damper 4. In the second embodiment, as shown in FIG. 11, the wavy curve 14 is a curve of the profile of a trapezoidal wave which is repetition of a wave element 13 in the width direction including the hill top portion 10t constituted of a linear upper side 30 parallel to the bottom surface 4A, the valley bottom portion 11b constituted of a linear lower side 31 parallel to the bottom surface 4A and the slope portion 12 constituted of a linear oblique side 32.

Note that the oblique side 32 can be provided with an circular arc portion having a sufficiently smaller curvature radius as compared with all the length of the oblique side 32 at a connection portion with the upper side 30 and/or the lower side 31. Herein, a sufficiently smaller curvature radius as compared with all the length of the oblique side 32 means 42% or less, preferably 35% or less and more preferably 20% or less of all the length of the oblique side 32.

Figure 12:
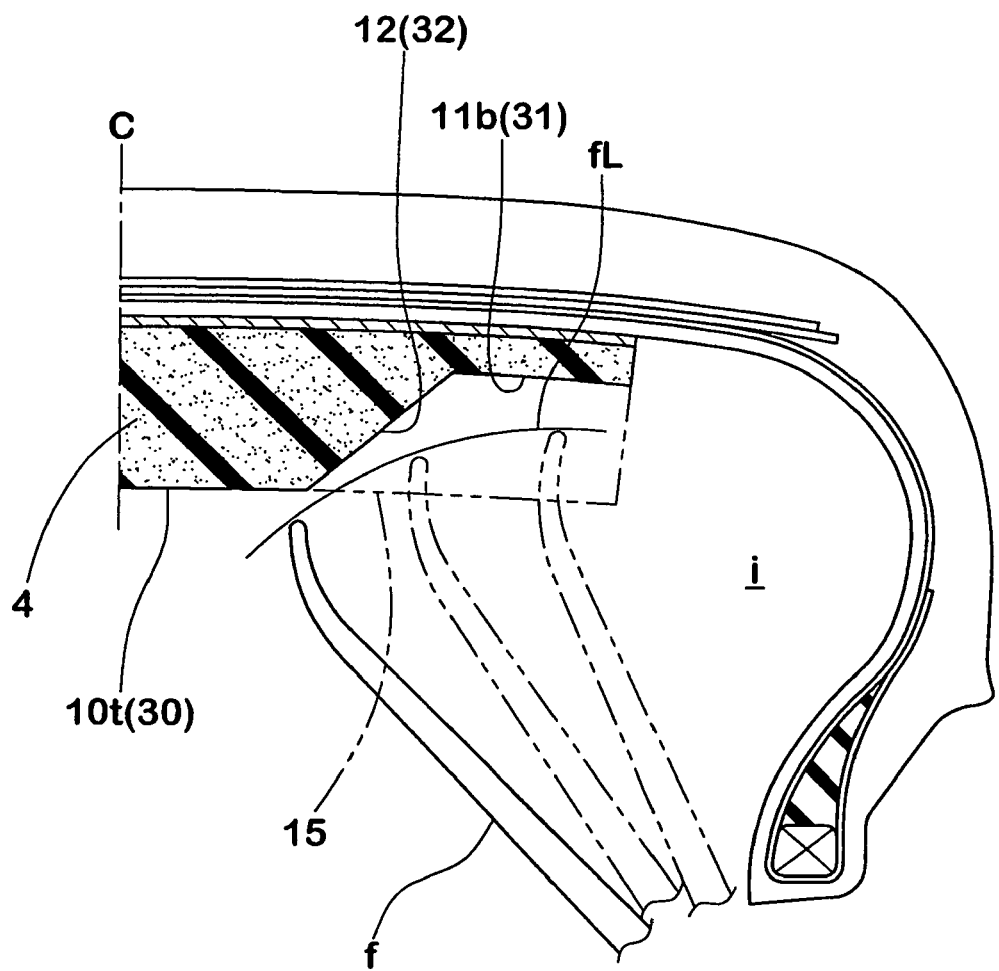
FIG. 12 is a partly sectional view describing a positional relationship of the noise damper of the second embodiment and a tire lever.

In a case of such a noise damper 4 of the second embodiment as well, not only is each end of the noise damper 4 terminated in the valley portion 11, but a thickness (te) of each end is also restricted to 15.0 mm or less; therefore, contact of the tire lever (f) with the noise damper 4 is avoided at a more limited chance. The noise damper 4 is constructed including a gentle slope 12 from each end to the hill top portion 10t. With the slope portion 12 adopted, a portion 15 interfering easily with the tire lever (f) is, as shown in FIG. 12, removed, which results in contact of the tire lever with the noise damper 4 at a further more limited chance. Since the oblique portion 12 approximates a locus in the shape of a circular arc (fL) depicted by the distal end of the tire lever (f), a frictional force between the tire lever (f) and the slope portion 12 would be small and a thrust of the distal end into the noise damper 4 would become difficult even if the tire lever was brought into contact with the noise damper 4. Hence, with both effects combined, the noise damper 4 of the second embodiment can effectively prevent extreme damage on the noise damper 4 and separation of the noise damper 4 from the tire 3 from occurring in a similar way to that in the noise damper 4 of the first embodiment.

In the second embodiment, an angle γ formed between the slope portion and the bottom surface 4A is preferably 70 degrees or less, more preferably 60 degrees or less and further more preferably 50 degrees or less in order to approximate the oblique portion 12 to the locus (fL) of a tire lever to a profile closer thereto.

Figure 13:
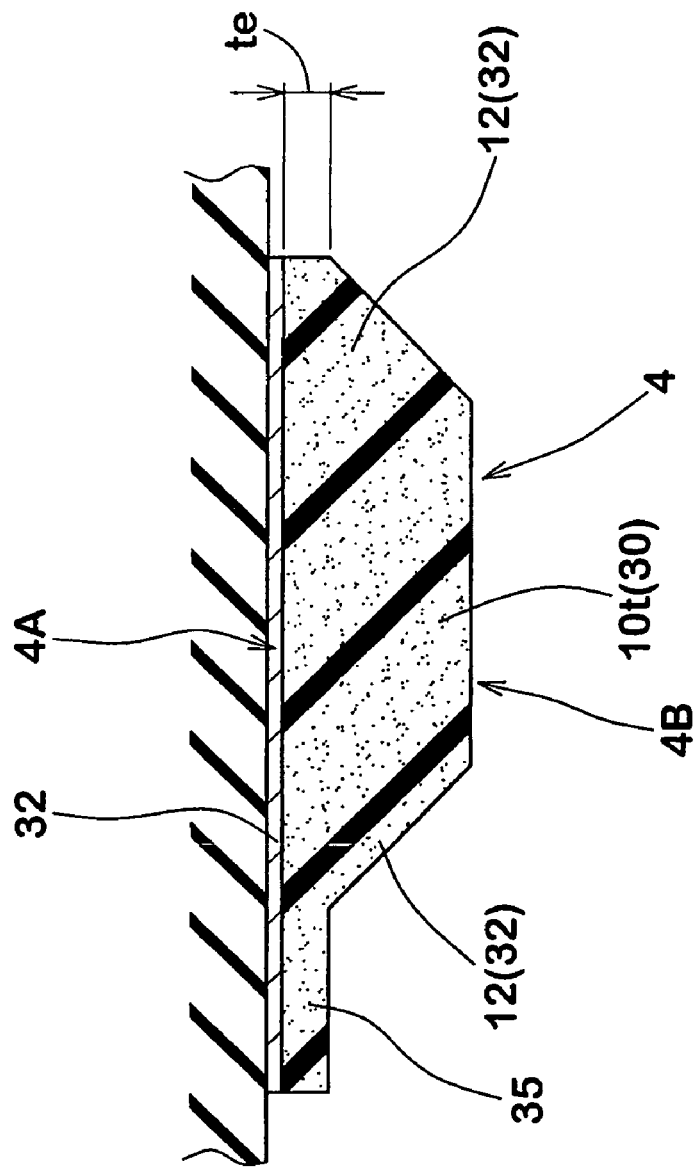
FIG. 13 is a sectional view showing another example of the noise damper of the second embodiment.

In the second embodiment, in a similar way to that in a case of the first embodiment, one or a plurality of hill tops 10t (the upper side 30) in the upper surface 4B of the noise damper 4 may be adopted. In FIGS. 11 and 13, there is illustrated a case where one hill top portion 10t (the upper side 30) is included. Especially, in FIG. 11, there is shown a mode that each end of the noise damper 4 is terminated at the valley bottom portions 11b (the lower side 31), that is a thin projection 35 along the lower side 31 is provided at each end. Note that in the noise damper 4 of FIG. 11, the upper surface 4B is formed with one wavy element 13. In FIG. 13, one end of the noise damper 4 is terminated at the slope portion 12 (an oblique side 32), but each end thereof may be terminated at the slope portions 12 (the oblique sides 32).

Figure 14:
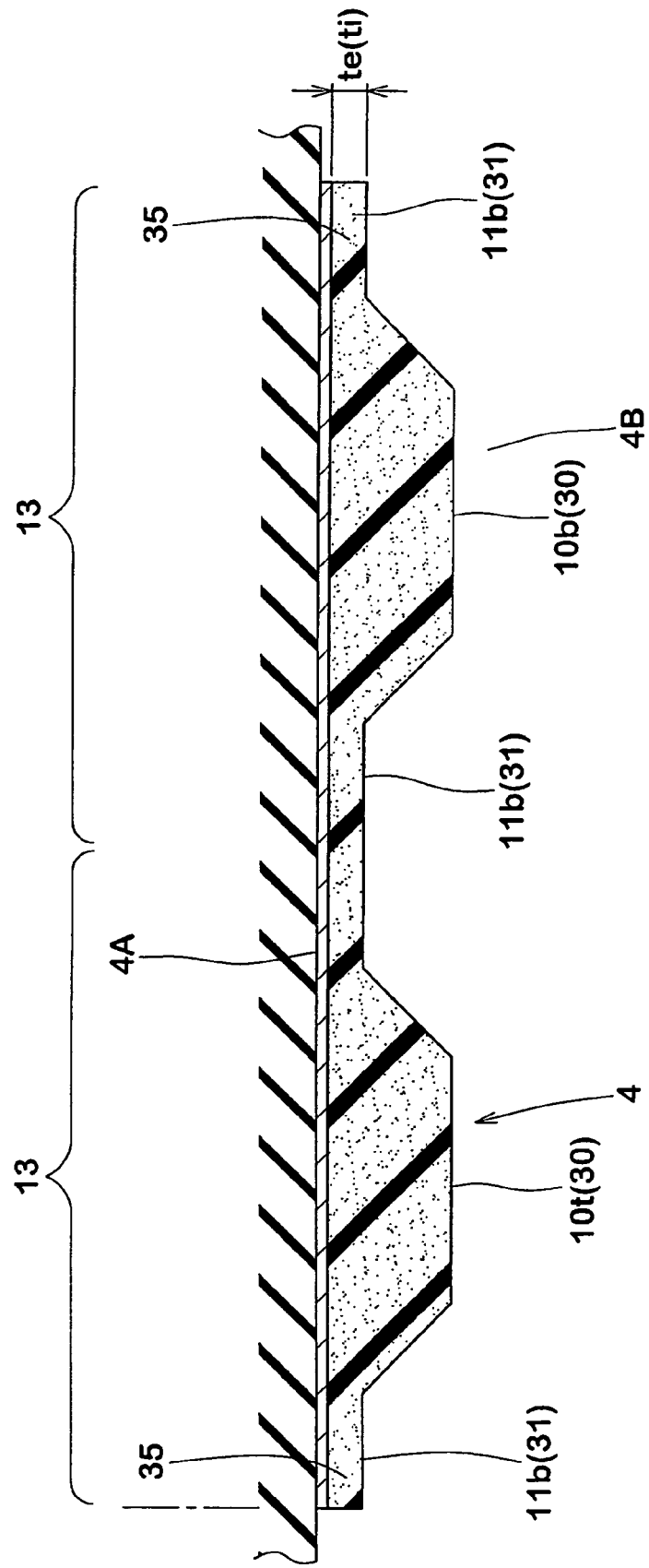
FIG. 14 is a sectional view showing still another example of the noise damper of the second embodiment.
Figure 15:
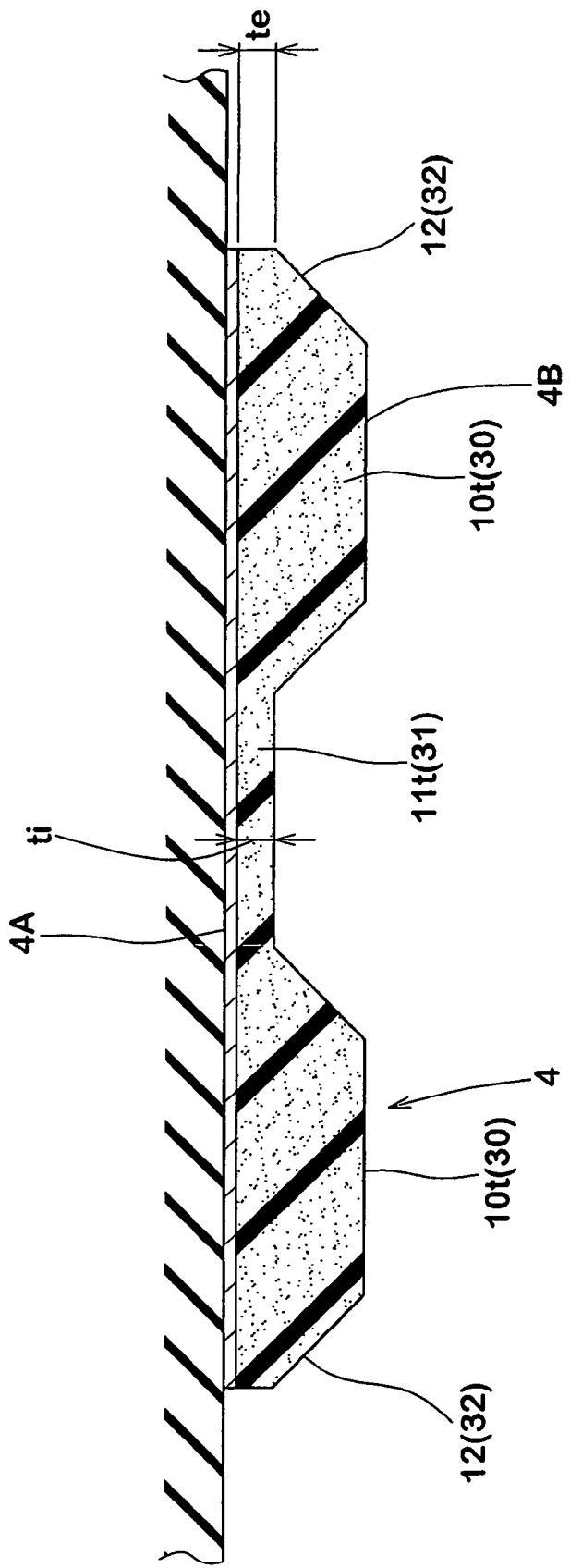
FIG. 15 is a sectional view showing yet another example of the noise damper of the second embodiment.

In FIGS. 14 and 15, there is illustrated a case where two hill tops 10t (two upper sides 30) are included. Especially, in FIG. 14, there is shown a case where each end of a noise damper 4 are terminated at the valley bottom portions 11b (lower sides 31), wherein the noise damper 4 has the upper surface 4B formed with two wavy elements 13. In FIG. 15, each end of a noise damper 4 is terminated at points on the respective slope portions 12 (the oblique sides 32), but only one end thereof may also be terminated at a point on the slop 12 (the oblique side 32).

Then, description will be given of a preferred method for forming a noise damper 4 having the wavy curve 14 in the profile of a trapezoid.

Figure 16A:
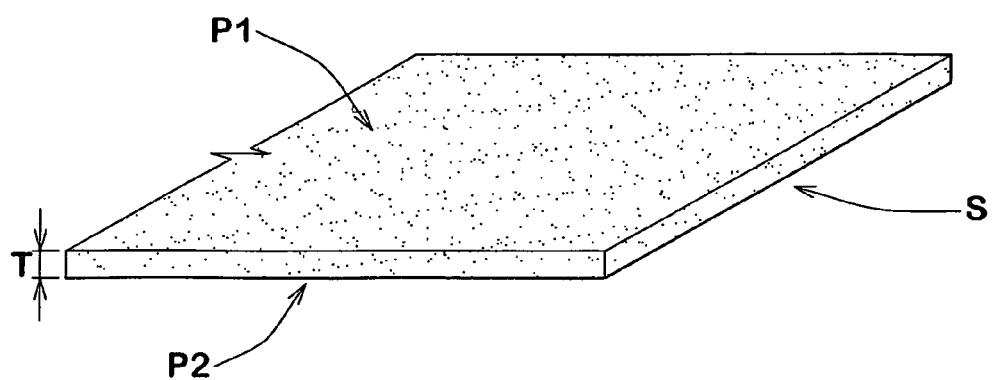
FIGS. 16(A) to 16(D) are perspective views describing a method for manufacturing a band-like member of the second embodiment.
Figure 16B:
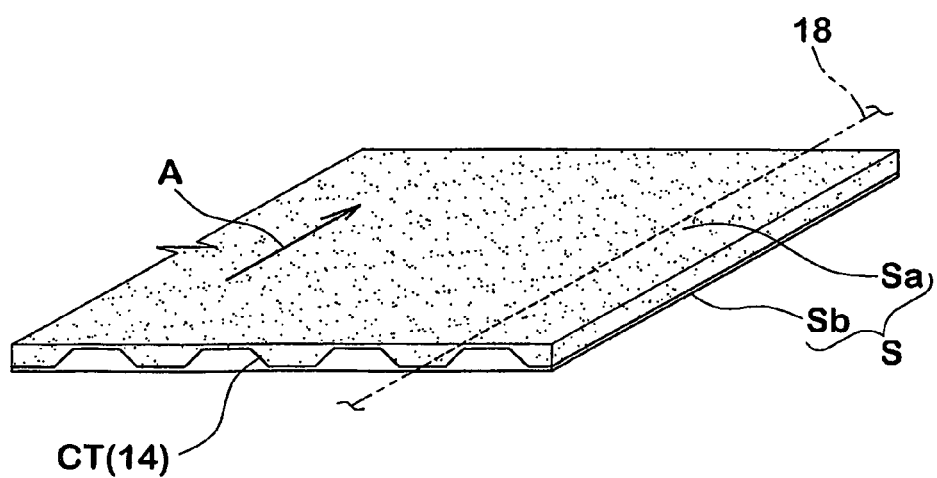

The formation method includes: a cutting step of slicing a flat plate-like sponge (S) along a combination of cutting planes CT extending in the width direction in the profile of trapezoidal wave into two half sponges (Sa and Sb) (FIG. 16(B)); and a division step of dividing the half sponges (Sa and Sb) into a plurality of noise dampers 4 by cutting the half sponges (Sa and Sb) in the length direction.

The flat plate sponge (S) is a sponge (S) having a first surface (P1) and a second surface (P2) substantially parallel to each other similar to that used in the formation method for the noise damper 4 in the first embodiment. A thickness (T) of the sponge (S) is equal to the sum (tm+ti) of the maximum thickness (tm) and the minimum thickness (ti).

In the cutting step, as shown in FIG. 16(B), a cutter 18 is moved along the profile of a trapezoidal wave in the width direction between the first surface (P1) and the second surface (P2). Thereby, the sponge (S) is sliced along the combination of cutting planes (CT) extending along the profile of a trapezoidal wave into two half sponges (Se and Sb). Such a forming is called a contour forming. The cutter 18 has a length of a blade longer than that of a length of the sponge (S). Preferable as a cutter 18 is of a cutting blade capable of mechanically cutting the sponge at an ordinary temperature, for example a split blade, but unpreferable is a cutter using a high temperature wire or the like to thermally cut the sponge since the cutter melts the surface of the sponge (S) and have a tendency to degrade an noise absorption effect.

With such a contour forming adopted, two half sponges (Sa and Sb) in the same combination of cutting planes (CT) of a trapezoidal wave can be efficiently obtained in a single process.

Figure 16C:
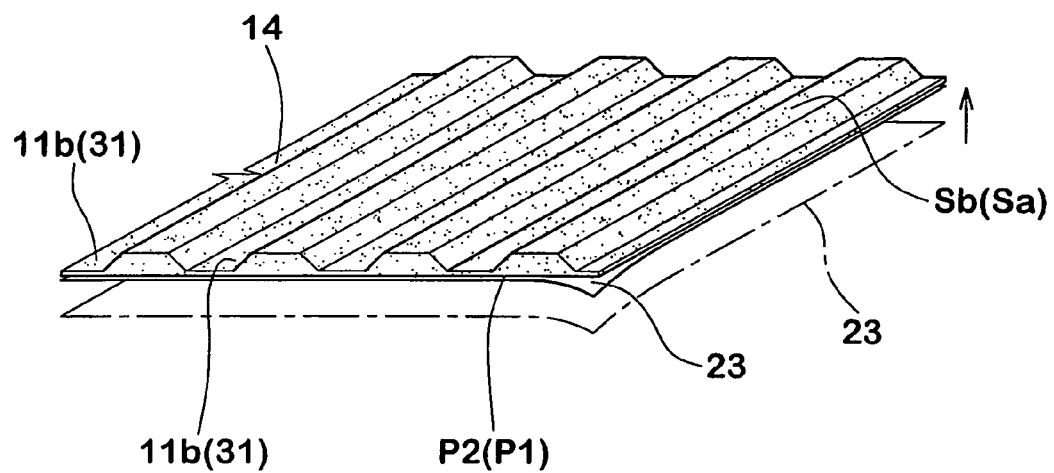
Figure 16D:
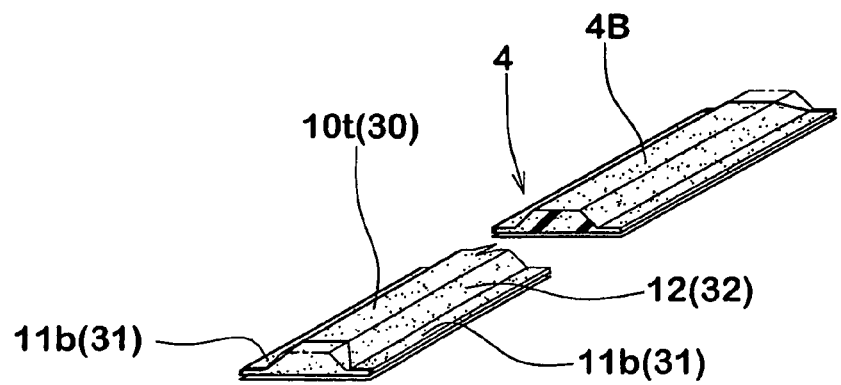

In the example, as shown in FIG. 16(C), performed is a pressure sensitive adhesive double coated tape adhering step of adhering one surface of a pressure sensitive adhesive double coated tape 23 on the first surface (P1) and the second surface (P2) of the half sponges (Sa and Sb). In this step, one pressure sensitive adhesive double coated tape 23 with a large width is adhered over all the surface of each of the surfaces (P1 and P2).

In the division step, as shown in FIGS. 6(C) and 6(D), the half sponges (Sa and Sb) on each of which the pressure sensitive adhesive double coated tape 23 is adhered is cut together with the pressure sensitive adhesive double coated tape 23 at positions corresponding to the valleys 11 with a small thickness (t) and preferably, at positions corresponding to the lower sides 31 (the valley bottom portions 11b) along the length direction A. Thereby, the half sponges (Sa and Sb) is divided into a plurality of noise dampers 4.

Herein, in order to obtain two half sponges (Sa and Sb) in the same profile by the contour forming, it is necessary that in one wavy element 13 of the wavy curve 14 in the profile of a trapezoidal wave, a width (Wy) of the upper side 30 is substantially equal to the sum (Wt+Wt) of widths of the lower sides 31 located on each side of the upper side 30 in the width direction.

In order to cut many of noise dampers 4 from one sponge (S) with the most effectiveness, in a case where thin projections 35 are provided at each end of a noise damper 4, it is preferable that the sum of the widths thereof (We) is larger than 0 mm and equal to or less than the width (Wy) of the upper side 30 and more preferable that the sum of the widths of the thin projections 35 (We) at each end is substantially equal to the width (Wy) of the upper side 30. It is the most preferable that the widths of the thin projections 35 (We) at both ends are equal to each other. Such a noise damper 4 can be obtained by cutting the half sponges (Sa and Sb) of FIG. 16(C) at middle points of the lower sides 31, thereby enabling a yield in terms of material to be higher. A noise damper 4 used in the invention is not limited to such a mode, however.

While description was given of the embodiment of the invention, the embodiment is only an example and needless to say that the invention can be implemented as modifications or alterations in various ways.

EXAMPLE A

With noise dampers of the first embodiment having specifications shown in Table 1, not only were assemblies of pneumatic tires (235/45ZR17) and rims (17×7.5JJ) fabricated as trials, but noise performance and damages when a tire was also demounted were tested. Pneumatic tires were vulcanization molded without coating a release agent coated on the inner surface of the tire. A bladder molding the inner surface of a tire that was used was without exhaust grooves on the surface. Hence, the inner surface of a tire was finished as a smooth and flat surface and had a good adherence to a noise damper.

Noise dampers were prepared using an ether-based polyurethane sponge with a specific gravity of 0.016 (manufactured by Marusuzu K.K. with a product number of E16), a length of which were all 185 cm and each of which had, as shown in FIG. 2, a taper cut at an angle of 45 degrees at each end in the tire circumferential direction. In the examples, the entire volume (V) of the tire inner space were all 26154 cm³. In Table 1, and FIGS. 17(A) to 17(D), there were shown volumes (Vs) of the noise dampers of the examples and the sectional profiles thereof (a unit of numerical values used in the figures are a millimeter). A noise damper and a tire inner surface (a tread inner surface) were adhered to each other with a pressure sensitive adhesive double coated tape (manufactured by Nitto Denko K.K. with a product number 5000NS).

A test method was as follows:

<Noise Performance>

A tire and a rim was assembled under an inner pressure of 200 kPa and all of the wheels of an automobile (a domestically manufactured FR car with a piston displacement of 3000 cc) each were mounted with the assembly. The noise in compartment when the automobile drove at a speed of 60 km/H on a road noise measuring road (a rough surface asphalt coated road) with one person on board was measured at an ear of the person in a driver's seat on the window side, and a sound pressure level of a peak value at a frequency in the neighborhood of 230 Hz was shown with an increment or a decrement above or below a noise in compartment of Comparative Example 1 (an assembly without a noise damper) as a reference.

<Durability of Noise Damper when Tire is Demounted>

A tire changer (manufactured by EIWA Co. with a model number of WING320) and a tire lever were used to demount a tire of an assembly from a rim. Twenty assemblies were prepared and twenty workers demounted the tires. Evaluation was obtained by comparison of the number (N1) of assemblies having suffered damage such as a cut or a tear with the number (N2) of assemblies the noise damper of each of which was separated from the tire inner surface.

<Cost of Noise Damper>

A manufacturing cost spent for manufacturing noise dampers to be used in 100 assemblies was expressed with an index relative to Comparative Example A2 as 100, wherein a smaller value is better.

Figure 18A:
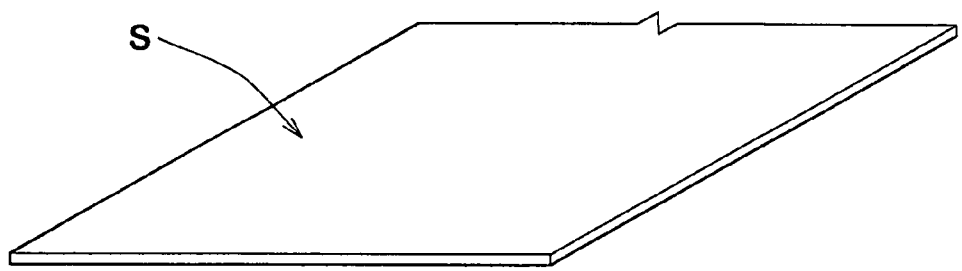
FIGS. 18(A) to 18(D) are perspective views describing a method for manufacturing band-like members of Comparative Examples A2 and B2 used in tests of Examples A and B.
Figure 18B:
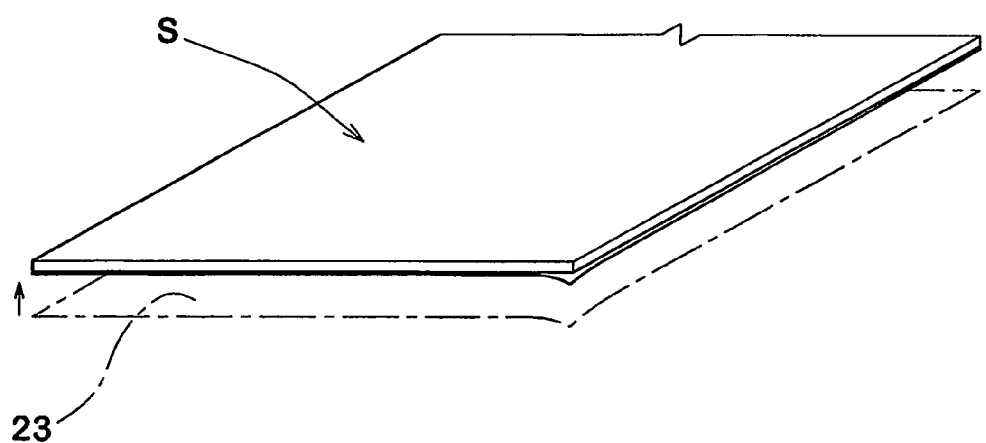
Figure 18C:
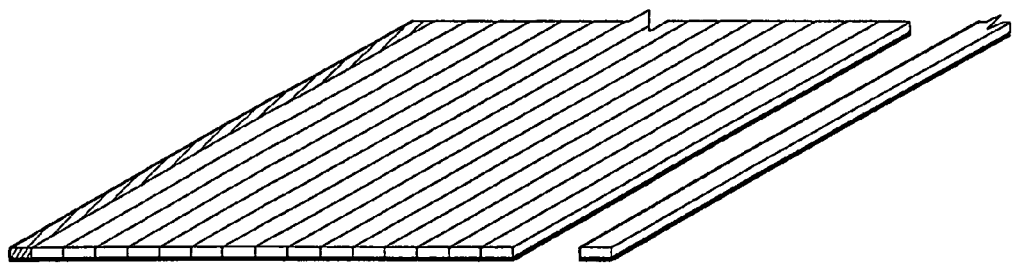
Figure 18D:
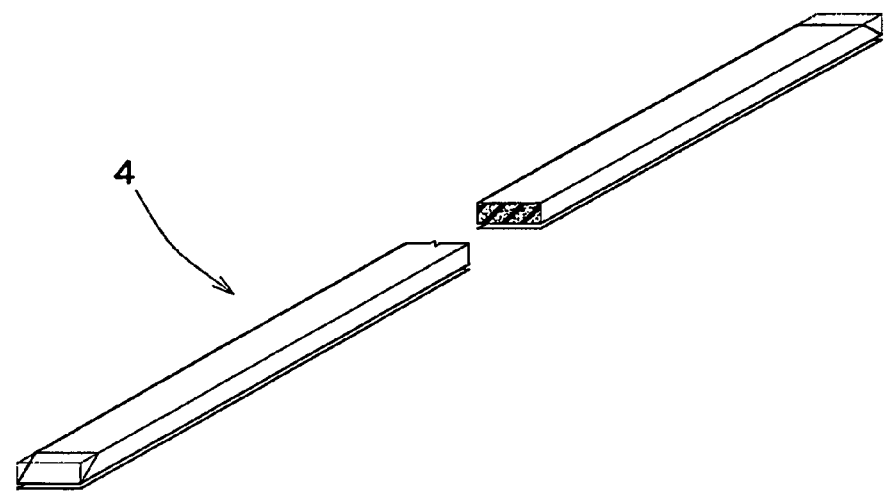

Note that noise dampers of the Comparative Example A2 were formed in a way described below. As shown in FIGS. 18(A) and 18(B), one pressure sensitive adhesive double coated tape 23 was adhered all over one surface of a flat-plate sponge (S). The sponge was, as shown in FIGS. 18(C) and 18(D), cut into a plurality of band-like pieces and taper forming was applied to each end of each band-like piece to thereby form a noise damper.

Figure 19A:
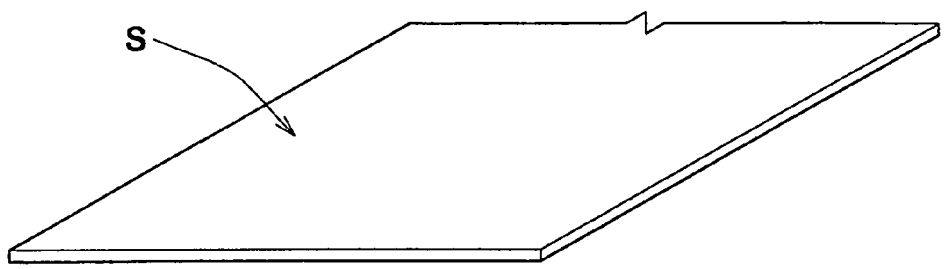
FIGS. 19(A) to 19(D) are perspective views describing a method for manufacturing band-like members of Comparative Examples A3 and B3 used in tests of Examples A and B.
Figure 19B:
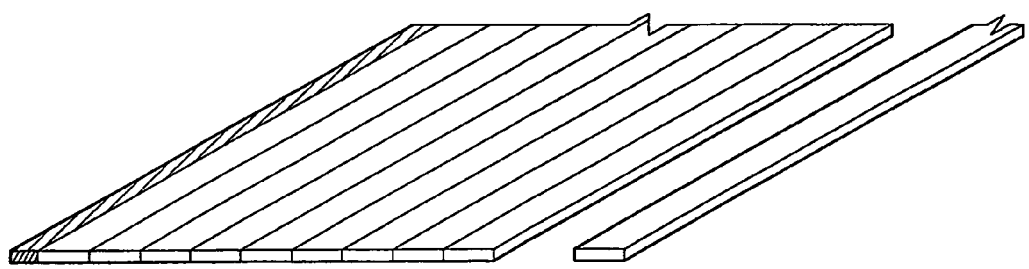

Noise dampers of Comparative Examples A3 were formed in a way described below. As shown in FIGS. 19(A) and 19(B), a flat-like sponge (S) is cut into a plurality of band-like pieces. Each band-like piece is formed so as to have a section shape thereof and each end thereof with a cutter and thereafter, a pressure sensitive adhesive double coated tape 28 was adhered to obtain a noise damper.

TABLE 1

Figure 17A:
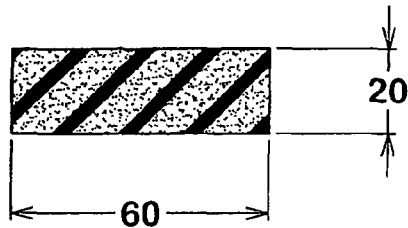
FIGS. 17(A) to 17(D) are sectional views of noise dampers used in a test of Example A.
Figure 17B:
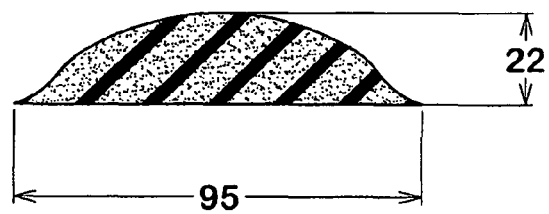
Figure 17C:
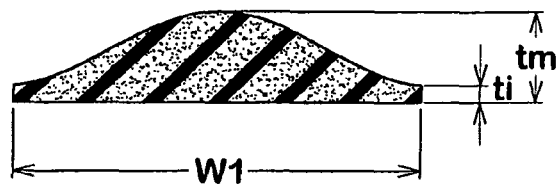
Figure 17D:
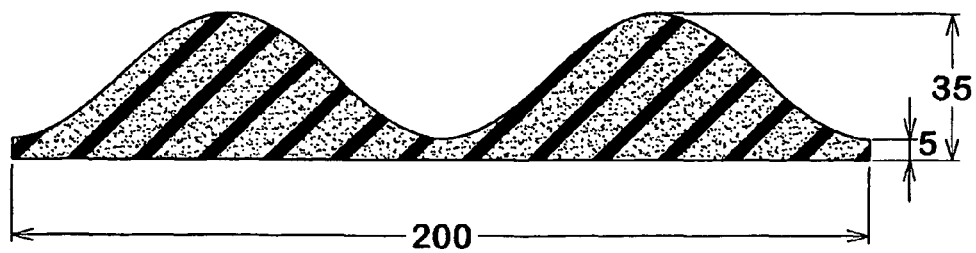

|  | Comparative Example A1 | Comparative Example A2 | Comparative Example A3 | Example A1 | Comparative Example A4 | Example A2 | Example A3 | Comparative Example A5 | Example A4 | Example A5 |
|---|---|---|---|---|---|---|---|---|---|---|
| Sectional shape | — | FIG. 17(A) | FIG. 17(B) | | | FIG. 17(C) | | | | FIG. 17(D) |
| Formation method | — | FIG. 18 | FIG. 19 | | | Profile method (FIG. 9 and FIG. 10) | | | | |
| Noise damper volume Vs (cm$^3$) | — | 2268 | 2344 | 2334 | 2020 | 2065 | 3322 | 3771 | 2334 | 4668 |
| Maximum thickness tm (mm) | — | 20 | 22 | 22 | 22 | 22 | 22 | 22 | 22 | 22 |
| Minimum thickness ti (mm) | — | 20 | 0 | 4.0 | 0.5 | 1.0 | 15.0 | 20.0 | 4.0 | 5.0 |
| Width W1 (mm) | — | 60 | 95 | 95 | 95 | 95 | 95 | 95 | 95 | 190 |
| Ratio (Vs/V) (%) | — | 8.7 | 9.0 | 8.9 | 7.7 | 7.9 | 12.7 | 14.4 | 8.9 | 17.8 |
| Manufacturing cost (index) | — | 100 | 520 | 120 | 104 | 106 | 171 | 194 | 110 | 210 |
| Noise performance (quantity of reduction) (dB) | (Reference) | −7.8 | −8.5 | −8.2 | −7.6 | −7.5 | −9.0 | −10.7 | −8.2 | −11.2 |
| Number of damaged noise dampers N1 | — | 6 | 1 | 1 | 1 | 1 | 3 | 6 | 1 | 1 |
| Number of separated noise dampers N2 | — | 2 | 0 | 0 | 0 | 0 | 1 | 2 | 0 | 0 |

EXAMPLE B

Noise dampers of the second embodiment with specifications shown in Table 2 were employed and not only were assemblies of pneumatic tires and rims are manufactured as trials, but a test similar to that in the Examples A was conducted. Parameters such as a sectional shape of noise dampers were as shown in Table and FIGS. 20(A) to 20(F) with a unit of millimeter.

A manufacturing cost spent for a noise damper was expressed with an index relative to Comparative Example B2 as 100, wherein a smaller value is better.

Note that a manufacturing method for noise dampers of Comparative Examples B2 and B3 is a method in conformity with that for noise dampers in Comparative Examples A2 and A3.

TABLE 2

Figure 19C:
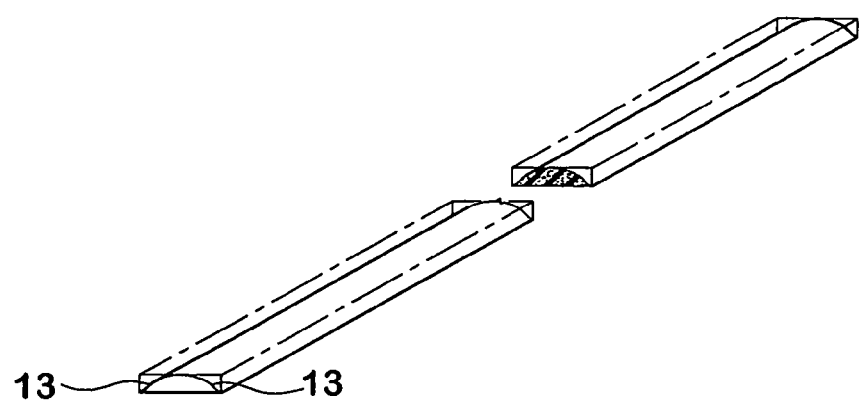
Figure 19D:
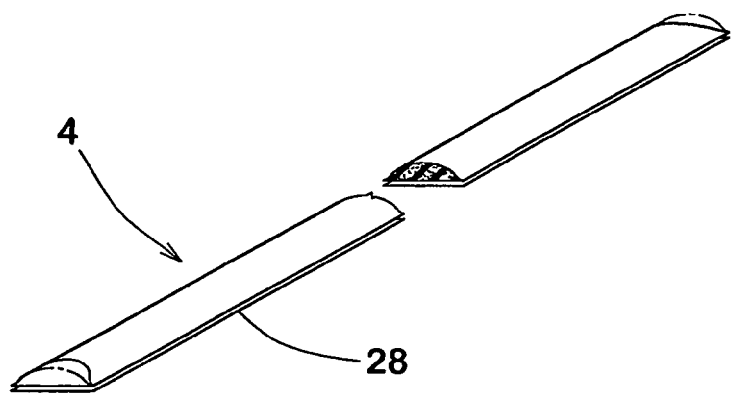
Figure 20A:
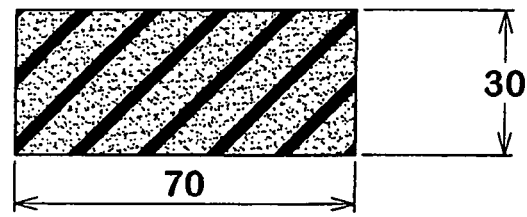
FIGS. 20(A) to 20(F) are sectional views of noise dampers used in a test of Example B.
Figure 20B:
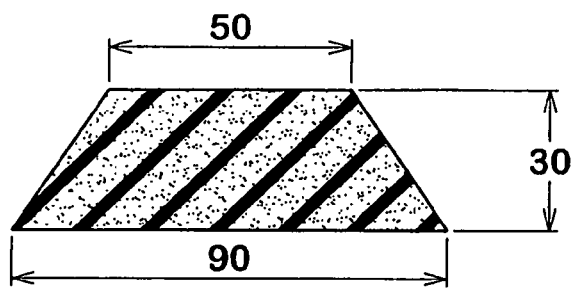
Figure 20C:
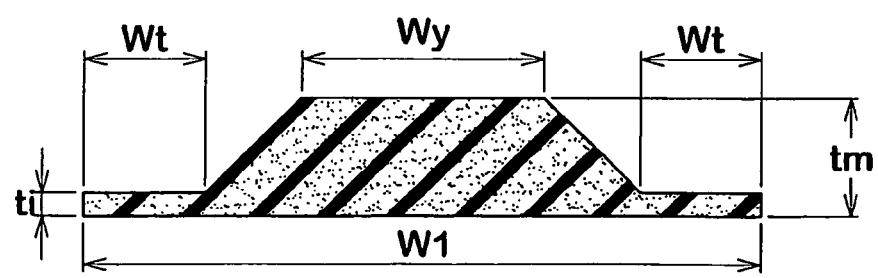
Figure 20D:
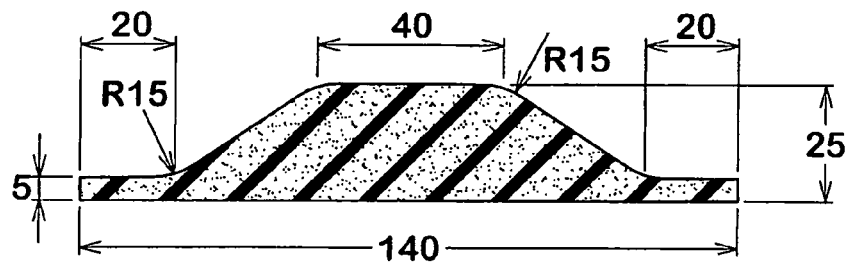
Figure 20E:
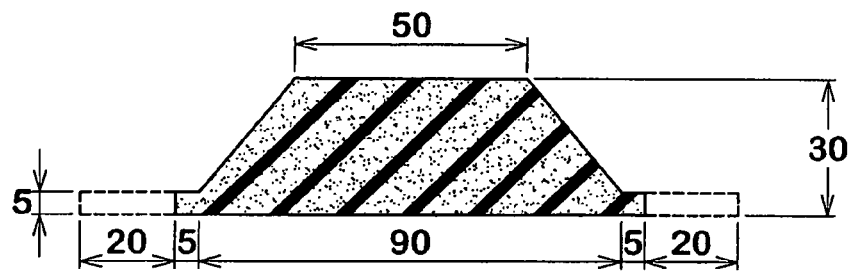
Figure 20F:
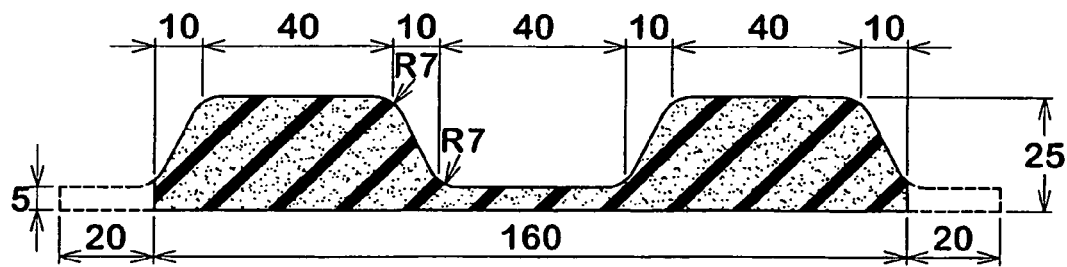

|  | Comparative Example B1 | Comparative Example B2 | Comparative Example B3 | Example B1 | Example B2 | Example B3 | Example B4 | Example B5 | Example B6 | Example B7 | Example B8 |
|---|---|---|---|---|---|---|---|---|---|---|---|
| Sectional shape | No data | FIG. 20(A) | FIG. 20(B) | | | FIG. 20(C) | | | FIG. 20(D) | FIG. 20(E) | FIG. 20(F) |
| Formation method | | FIG. 18 | FIG. 19 | | | FIG. 16 (contour forming) | | | | | |
| Noise damper volume Vs (cm$^3$) | | 3969 | 3969 | 3969 | 3374 | 3440 | 5292 | 5954 | 3969 | 4158 | 5292 |

TABLE 2-continued

| | Comparative Example B1 | Comparative Example B2 | Comparative Example B3 | Example B1 | Example B2 | Example B3 | Example B4 | Example B5 | Example B6 | Example B7 | Example B8 |
|---|---|---|---|---|---|---|---|---|---|---|---|
| Maximum thickness tm (mm) | | 30 | 30 | 25 | 25 | 25 | 25 | 25 | 25 | 30 | 25 |
| Minimum thickness ti (mm) | | — | — | 5 | 0.5 | 1 | 15 | 20 | 5 | — | 5 |
| Width W1 (mm) | | 70 | 90 | 140 | 140 | 140 | 140 | 140 | 140 | 90 | 160 |
| Width of hill top portion Wy (mm) | | 70 | 50 | 40 | 40 | 40 | 40 | 40 | 40 | 50 | 40 |
| Width of thin projection Wt (mm) | | — | 0 | 20 | 20 | 20 | 20 | 20 | 20 | 5 | 0 |
| Ratio (Vs/V) (%) | 0 | 15.2 | 15.2 | 15.2 | 12.9 | 13.2 | 20.2 | 22.8 | 15.2 | 15.9 | 20.2 |
| Manufacturing cost (index) | — | 100 | 500 | 120 | 117 | 118 | 125 | 127 | 120 | 130 | 230 |
| Noise performance (quantity of reduction) (dB) | (Reference) | −10.8 | −10.7 | −10.4 | −9.0 | −10.1 | −11.1 | −11.0 | −10.3 | −10.8 | −11.1 |
| Number of damaged noise dampers N1 | — | 9 | 4 | 2 | 1 | 1 | 3 | 6 | 1 | 3 | 3 |
| Number of separated noise dampers N2 | — | 3 | 0 | 0 | 0 | 0 | 1 | 2 | 0 | 0 | 0 |

Brief description will be given of the test results.

COMPARATIVE EXAMPLES A2 AND B2

The noise dampers of Comparative Examples A2 and B2 were suitable for mass production with a low manufacturing cost. The noise dampers, however, interfere with a tire lever with ease and a conventional fault that many of damages and separations occur was not solved.

COMPARATIVE EXAMPLES 3

The noise dampers of Comparative Examples A3 and B3 can suppress damages thereon when tires were exchanged. However, since a thickness (te) of each end of each noise damper was zero, forming for sectional shape of each band-like piece and adhesion of a pressure sensitive adhesive double coated tape 28 thereon was necessary, as shown in FIGS. 19(B) and 19(C), after the sponge is divided into a plurality of band-like pieces. Hence, a manufacturing cost for a noise damper is high and the noise damper is not suitable for mass production. As shown in FIG. 19(C), waste sponge was large in quantity and a yield was low.

EXAMPLES A1 TO A6 AND B1 TO B8

The noise dampers exert excellent noise performance and at the same time, damages on the silences when tires were exchanged were able to be suppressed. Besides, the noise dampers are suitable for mass production and generation of waste material can be suppressed to thereby enable a manufacturing cost to be suppressed low.

EXAMPLE C

Noise dampers with water repellency were manufactured as trials based on specifications of Table 3 and tests were conducted on physical properties (a hardness, a tensile strength, an elongation and water repellency) and productivity when sponges were produced. The noise dampers were tested in terms of water absorption using composites each obtained by adhering a noise damper to a tread inner surface of a pneumatic tire (195/65R15). Composites in a state of no absorption of water were mounted to rims (in size of 15×6), which were subjected to a test for noise performance.

The noise dampers were in the same shape and of the same size except a material of a sponge and had a rectangular section with a size of 3.0 cm high, 7.0 cm wide and 185 cm long. Both ends of each noise damper were taper cut at an angle of 45 degrees.

In each example, the entire volume (V) of a tire inner space was 30500 cm$^3$, a volume (Vs) of a noise damper was 3822 cm$^3$ and a ratio Vs/V was 12.5%. A noise damper and a tire inner surface (a tread inner surface) were adhered to each other with a pressure sensitive adhesive double coated tape (manufactured by Nitto Denko K.K. with a product number of 5000NS)

Comparative Examples C1 and C2 used a conventional ether-based polyurethane sponge without a water repellent (manufactured by Maru Suzu K.K. with a product number E16) and in Comparative Example 2, the surface of a noise damper is covered with a water resistant sheet (a polyethylene film in the example).

Figure 21:
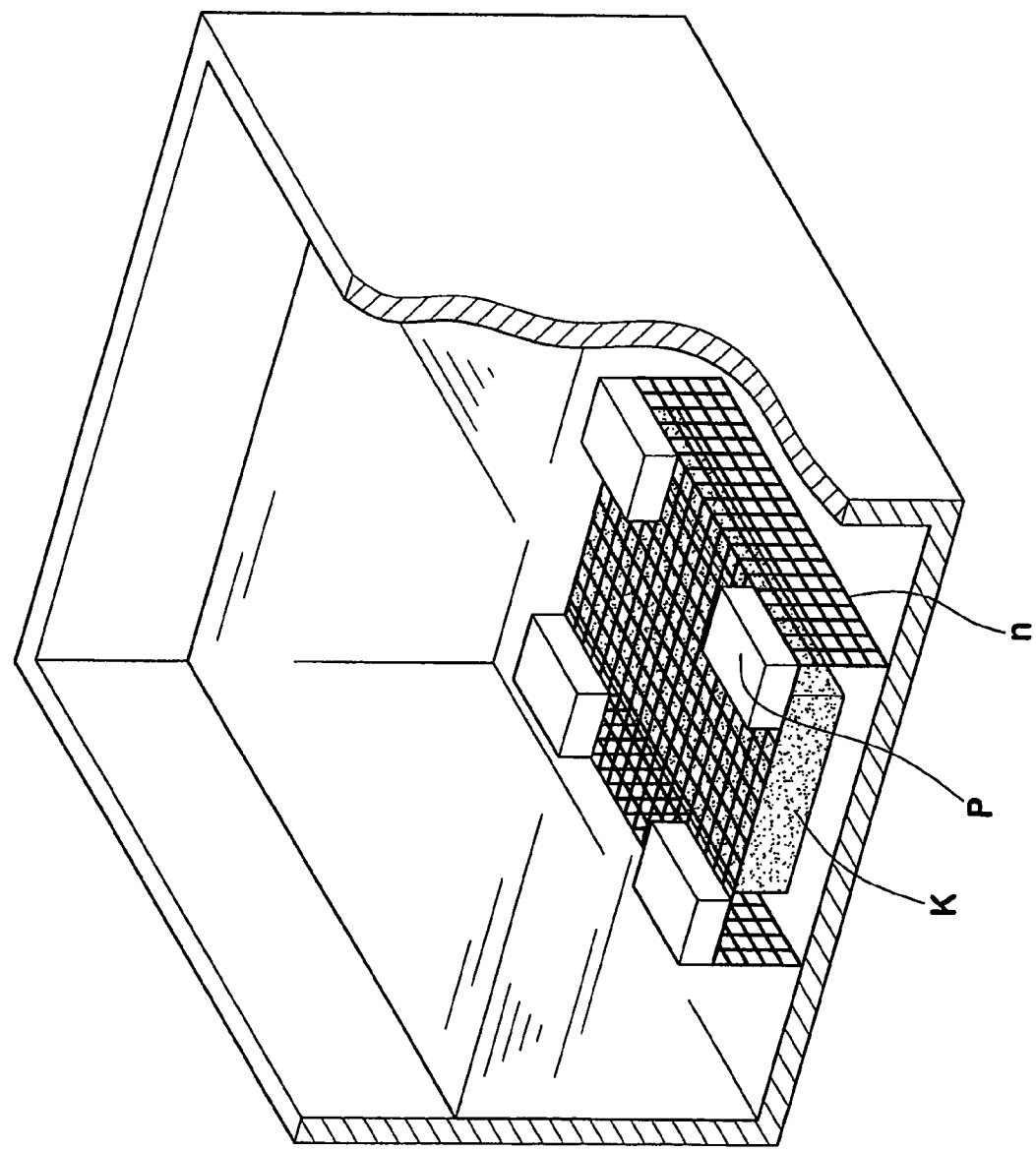
FIG. 21 is a perspective view of an apparatus describing a test on water repellency.

A test method is as follows:
<Hardness>
Hardness measured according to Method A (Section 6.3) of methods for a hardness of Section 6 stipulated in "Testing Method for Soft Urethane foam" of JIS K6400.
<Elongation>
Elongation was measured on a test piece in Shape No. 1 according to a measuring method of "Tensile Strength and an Elongation" of Section 10 in said method.
<Tearing Strength>
Tearing strength measured according to a measuring method for "A Tearing Strength" of Section 11 in said method.
<Water Repellency"
A test piece k of a sponge with a size of 300 mm long, 70 mm wide and 30 mm high was, as shown in FIG. 21, immersed in a water bath with a water depth of 150 mm and left at rest for 24 hr, thereafter an increment in weight was measured and the weight was compared with an initial weight (corresponding to a weight of a dry test piece k).

A case where an increment in weight was less than 100% of the initial weight was expressed with a symbol of ◯ and a case of 100% or more was expressed with a symbol X.

A symbol n in the figure indicates a presser plate of a punched metal with a hole diameter of 5 mm folded in U-shaped in capital letter and a test piece k is immersed in the water by the presser plate so that any load is imposed thereon. A symbol p is weights (about 500 g/one weight) disposed at 4 corners of the presser plate n to prevent the presser plate from floating on the surface of water by buoyance.

<Productivity in Formation of Sponge>

The presence or absence of various problems arising in a production process such as an agitation step for a mixed composition and a foam molding step are shown (in a case of the presence, the problem is described)

<Water Absorption Test>

Sets of 10 tires to which noise dampers were adhered were erected and in this state, 3 of water was poured into a vessel, in which state the noise dampers are left at rest for 24 hr. Thereafter, the water was discarded, the water on the tire inner surface and the surface of a noise damper of each composite was wiped off with a cloth, increases in weight were measured and the averages are shown. Even in a case of no noise damper, a tire inner surface is not perfectly dried; therefore, a weight was usually increased by 10 g.

The tires after the water absorption test were mounted to the right front wheel of an automobile (a domestically manufactured FF car with a piston displacement of 2000 cc) to a rim (15×6JJ) under an inner pressure of 200 kPa, and the automobile was driven on a track at a speed of 100 km/h) and the presence or absence of vibration in the driving was evaluated by sensation of a driver. Of the ten test tires, there was shown the number of tires causing vibrations.

<Noise Performance>

The tires to which dried noise dampers were adhered were mounted to all the wheel of an automobile (a domestically manufactured FF car with a piston displacement of 2000 cc) to rims (15×6JJ) under an inner pressure (2000 kPa) and the noise in compartment when the automobile drove at a speed of 60 km/H on a road noise measuring road (a rough surface asphalt coated road) with a person on board was measured at an ear of the person in a driver's seat on the window side, and was shown a sound pressure level of a peak value at a frequency in the neighborhood of 230 Hz with an increment or a decrement above or below a noise in compartment of Comparative Example C1 (an assembly without a noise damper) as a reference.

TABLE 3

| | Comparative Example C1 | Comparative Example C2 | Example C1 | Example C2 | Example C3 | Example C4 | Example C5 |
|---|---|---|---|---|---|---|---|
| Sectional shape of noise damper | rectangle | rectangle | rectangle | rectangle | rectangle | rectangle | rectangle |
| polyisocyanate <*1> | 57 | 57 | 57 | 57 | 57 | 57 | 57 |
| Polyol 1 <*2> | 100 | 100 | 3 | 58 | 25 | 25 | 25 |
| Polyol 2 <*3> | 0 | 0 | 97 | 42 | 75 | 75 | 75 |
| Wafer repellent <*4> | 0 | 0 | 25 | 80 | 40 | 40 | 40 |
| Foaming agent (water) (parts by weight) | 6.0 | 6.0 | 4.5 | 3.5 | 4.5 | 2.8 | 6.0 |
| Others <*5> (parts by weight) | 1.6 | 1.6 | 1.6 | 1.6 | 1.6 | 1.6 | 1.6 |
| Specific gravity (density) ×$10^{-3}$ | 16 | 16 | 25 | 45 | 23 | 30 | 16 |
| Hardness <N> | 90 | 90 | 100 | 100 | 100 | 100 | 100 |
| Tensile strength <kPa> | 4 | 4 | 5 | 4 | 5 | 5 | 5 |
| Elongation <%> | 180 | 180 | 180 | 180 | 180 | 180 | 180 |
| Water repellency | X | X | ◯ | ◯ | ◯ | ◯ | ◯ |
| Productivity | good | good | good | good | good | good | good |
| Water absorption test | | | | | | | |
| Absorbed water quantity <g> | 360 | 10-450 | 30 | 20 | 20 | 20 | 30 |
| Automobile vibrations | 10/10 | 7/10 | 0/10 | 0/10 | 0/10 | 0/10 | 0/10 |
| Road noise performance <dB> | −10.8 | −10.2 | −10.7 | −11.1 | −10.4 | −11 | −10.1 |

| | Comparative Example C3 | Comparative Example C4 | Comparative Example C5 | Comparative Example C6 | Comparative Example C7 |
|---|---|---|---|---|---|
| Sectional shape of noise damper | rectangle | rectangle | rectangle | rectangle | rectangle |
| polyisocyanate <*1> | 57 | 57 | 57 | 57 | 57 |
| Polyol 1 <*2> | 2 | 65 | 25 | 25 | 25 |
| Polyol 2 <*3> | 98 | 35 | 75 | 75 | 75 |
| Wafer repellent <*4> | 25 | 80 | 90 | 22 | 40 |

TABLE 3-continued

| | | | | | |
|---|---|---|---|---|---|
| Foaming agent (water) (parts by weight) | 4.5 | 4.5 | 4.5 | 6.0 | 1.0 |
| Others <*5> (parts by weight) | 1.6 | 1.6 | 1.6 | 1.6 | 1.6 |
| Specific gravity (density) ×10$^{-3}$ | 30 | 35 | — | 10 | 65 |
| Hardness <N> | 100 | 100 | — | 90 | 180 |
| Tensile strength <kPa> | 4 | 3 | — | 4 | 5 |
| Elongation <%> | 180 | 180 | — | 180 | 180 |
| Water repellency | X | X | — | X | o |
| Productivity | insufficient agitation | insufficient agitation | bad molding | good | good |
| Water absorption test | | | | | |
| Absorbed water quantity <g> | 320 | 290 | — | 340 | 20 |
| Automobile vibrations | 10/10 | 10/10 | — | 10/10 | 0/10 |
| Road noise performance <dB> | −11.1 | −11.2 | — | −9.7 | −5 |

The <*1> to <*5> in the table are detailed as followed:
<*1> is polyisocyanate (manufactured by Nihon Urethane K.K. with a trade name of T-80)
<*2> is polyester polyol (manufactured by Sanyo Kasei K.K. with a trade name of AH-405)
<*3> is polyester polyether copolymer polyol (manufactured by Mitsui Takeda Chemical K.K. with a trade name of L-50)
<*4> is distearyl dimerate
<*5> is a mixture of a catalyst (amine-based N,N-dimethylaminoethanol (DMAE) 0.3 part by weight metal catalyst (organic acid metal salt or stannous otoate) 0.3 part by weight a foam control agent (manufactured by Toray Silicon K.K. with a trade name of SH-193) 1.0 part by weight Since comparative Example C1 is high in water absorption, a noise damper acts as a large cause for automobile vibrations or the like when exposed to wafer. Note that in the case of Comparative example 2, no problem occurs by exposure in a short time of the order of 1 hr since a silence is covered by a water resistant sheet, whereas in a case where a noise damper is exposed to water for a long time, automobile vibrations or the like tends to occur by water intruded from a pin hole. Especially, in a case where water intruded through a pin hole, there is available no drying method for the sponge except for removal of a water resistant sheet and Comparative Example C2 has, in a practical sense, more problematical than Comparative Example C1 because of difficulty of discovery of a pin hole.

Examples C1 to C5 not only can secure sufficiently physical properties such as a hardness, a tensile strength and elongation, but also can exert water repellent performance to reduce water absorption and to thereby enable automobile vibrations or the like to be prevented. The examples further can exert an excellent road noise performance.

Since in Comparative Example C3, a mixing quantity of polyester polyol is less than a value in the range of from 3 to 60% by weight, compatibility between a water repellent and polyester polyether copolymer polyol worsens, to generate insufficient agitation, thereby disabling a water repellent to be uniformly disposed. As a result, it was able to be confirmed that even in a case where a water repellent is properly mixed, the water repellent performance cannot be effectively exerted. As in Comparative Example 4, however, even if a mixing quantity of polyester polyol exceeds the range of from 3 to 60%, insufficient agitation is caused to thereby disable water repellent performance to be effectively exerted, which in turn decreases a tensile strength of a foam and an elongation, thereby making it difficult to secure a strength as a noise damper.

If a mixing quantity of a water repellent exceeds the range of from 25 to 80 parts by weight as in Comparative Example 5, foam cannot be produced since a water repellent acts as a plasticizer. On the contrary, if a mixing quantity of a water repellent is reduced to a value less than the range of from 25 to 80 parts by weight, a water repellent performance cannot be effectively exerted.

If water as a foaming agent is excessively smaller in quantity, a specific gravity of a sponge is excessively larger since no sufficient foaming is achieved, which in turn, not only reduce road noise performance to a lower level, but also causes increase in tire weight and deterioration in weight balance to disadvantage of a tire.

What is claimed is:

1. A method for forming a noise damper, wherein the noise damper comprises:

a band-like noise damper, made of a sponge having a volume in the range of from 0.4 to 20% of the entire volume of a tire inner space enclosed by the rim and the pneumatic tire, having a bottom surface fixed on a tire inner surface or a rim inner surface surrounding the tire inner space and an upper surface facing the tire inner space, and a noise damper extending in the tire circumferential direction in the tire inner space;

wherein in a tire meridian section including the tire axis; the noise damper is of a laterally long, flat sectional shape having a maximum thickness value (tm) from the bottom surface to the upper surface in the range of from 5 to 45 mm and having a width (W1) of the bottom surface more than the maximum thickness value (tm);

the upper surface extends along a wavy curve that is repetition of a wavy element in the width direction including a hill top portion having the maximum thickness value (tm), valley bottom portions on each side of the hill top portion having the minimum thickness value (ti) and slope portions extending down to the respective valley bottom portions from the hill top portion;

each end in the width direction of the upper surface is terminated at the valley bottom portions or the slope portions, and a thickness (te) from the upper surface to the bottom surface is in the range of from 1.0 to 15.0 mm; and the wavy curve is of a sine wave;

the method comprising:
- a transport step of feeding a flat plate-like sponge having first and second surfaces substantially parallel to each other in the length direction perpendicular to the thickness direction;
- a deformation step of deforming the fed sponge in the profile of a sine wave in section perpendicular to the length direction by pressing each of the first and second surfaces of the sponge alternately toward the other surface;
- a cutting step of obtaining two half sponge sections, each having a profile of a sine wave and being reversal of each other in profile in a state where the pressing pressure is removed, by slicing the sponge deformed in the profile of a sine wave between the first and second surfaces along a flat cutting plane continuously extending in the width direction; and
- a division step of dividing the half sponges to a plurality of noise dampers by cutting the half sponges at valley portions thereof each having a smaller thickness along the length direction.

2. A method for forming a noise damper, wherein the noise damper comprises:
- a band-like noise damper, made of a sponge having a volume in the range of from 0.4 to 20% of the entire volume of a tire inner space enclosed by the rim and the pneumatic tire, having a bottom surface fixed on a tire inner surface or a rim inner surface surrounding the tire inner space and an upper surface facing the tire inner space, and a noise damper extending in the tire circumferential direction in the tire inner space;
- wherein in a tire meridian section including the tire axis; the noise damper is of a laterally long, flat sectional shape having a maximum thickness value (tm) from the bottom surface to the upper surface in the range of from 5 to 45 mm and having a width (W1) of the bottom surface more than the maximum thickness value (tm);
    - the upper surface extends along a wavy curve that is repetition of a wavy element in the width direction including a hill top portion having the maximum thickness value (tm), valley bottom portions on each side of the hill top portion having the minimum thickness value (ti) and slope portions extending down to the respective valley bottom portions from the hill top portion;
    - each end in the width direction of the upper surface is terminated at the valley bottom portions or the slope portions, and a thickness (te) from the upper surface to the bottom surface is in the range of from 1.0 to 15.0 mm; and wherein
    - the wavy curve is a curve in the profile of a trapezoidal wave that is repetition of a wavy element in the width direction including:
    - the hill top portion constituted of a linear upper side parallel to the bottom surface; the valley bottom portion constituted of a linear lower side parallel to the bottom surface; and
    - the slope portion constituted of a linear oblique side; the method comprising:
    - a cutting step of obtaining two half sponge sections, each having a profile of a trapezoidal wave by slicing a flat plate-like sponge having first and second surfaces substantially parallel to each other between the first and second surfaces along a combination of cutting planes continuously extending in the profile of a trapezoidal wave in the width direction; and
    - a division step of dividing the half sponges to said plurality of noise dampers by cutting the valley portions each with a smaller thickness of a half sponge along the length direction.

* * * * *